(12) United States Patent
Eisinger et al.

(10) Patent No.: US 11,745,958 B2
(45) Date of Patent: Sep. 5, 2023

(54) CONVEYOR DEVICE WITH AT LEAST TWO CONVEYOR CARRIAGES AND A POWERTRAIN BRAKE FOR A CROSS BELT CONVEYOR ON AT LEAST ONE OF THE CONVEYOR CARRIAGES

(71) Applicant: INTERROLL HOLDING AG, Sant' Antonino (CH)

(72) Inventors: Thomas Eisinger, Sinsheim (DE); Heinrich Droste, Sinsheim (DE)

(73) Assignee: INTERROLL HOLDING AG, Sant' Antonino (CH)

( * ) Notice: Subject to any disclaimer, the term of this patent is extended or adjusted under 35 U.S.C. 154(b) by 494 days.

(21) Appl. No.: 17/257,979

(22) PCT Filed: Jul. 4, 2019

(86) PCT No.: PCT/EP2019/067999
§ 371 (c)(1),
(2) Date: Jan. 5, 2021

(87) PCT Pub. No.: WO2020/011643
PCT Pub. Date: Jan. 16, 2020

(65) Prior Publication Data
US 2021/0155418 A1    May 27, 2021

(30) Foreign Application Priority Data
Jul. 13, 2018   (DE) .................... 10 2018 005 570.2

(51) Int. Cl.
*B65G 47/96*   (2006.01)
*F16D 49/00*   (2006.01)
(Continued)

(52) U.S. Cl.
CPC .......... *B65G 47/91* (2013.01); *B65G 17/345* (2013.01); *F16D 49/00* (2013.01); *F16D 59/02* (2013.01);
(Continued)

(58) Field of Classification Search
CPC ....... B65G 17/345; B65G 47/96; F16D 49/00; F16D 59/02; F16D 65/14; F16D 2121/14;
(Continued)

(56) References Cited

U.S. PATENT DOCUMENTS 2,319,617 A    5/1943   Manierre
4,712,965 A *  12/1987  Canziani ................ B61G 5/02
                                                    104/140
(Continued)

FOREIGN PATENT DOCUMENTS

CN   1224561 C    10/2005
EP   1041019 A2   10/2000
(Continued)

OTHER PUBLICATIONS

International Search Report and Written Opinion of the International Searching Authority, issued in PCT/EP2019/067999, dated Oct. 10, 2019; ISA/EP.

(Continued)

*Primary Examiner* — Mark A Deuble
(74) *Attorney, Agent, or Firm* — Michael Soderman

(57) ABSTRACT

The invention relates to a conveyor device with at least one first and second conveyor carriage which are arranged one behind the other in the conveyor direction (F), a cross belt conveyor which is formed on at least the second conveyor carriage for conveying material to be conveyed in a cross conveyor direction (Q) oriented substantially transversely to the conveyor direction (F), and a powertrain brake for the cross belt conveyor. An operating device is arranged on the
(Continued)

Figure 1:
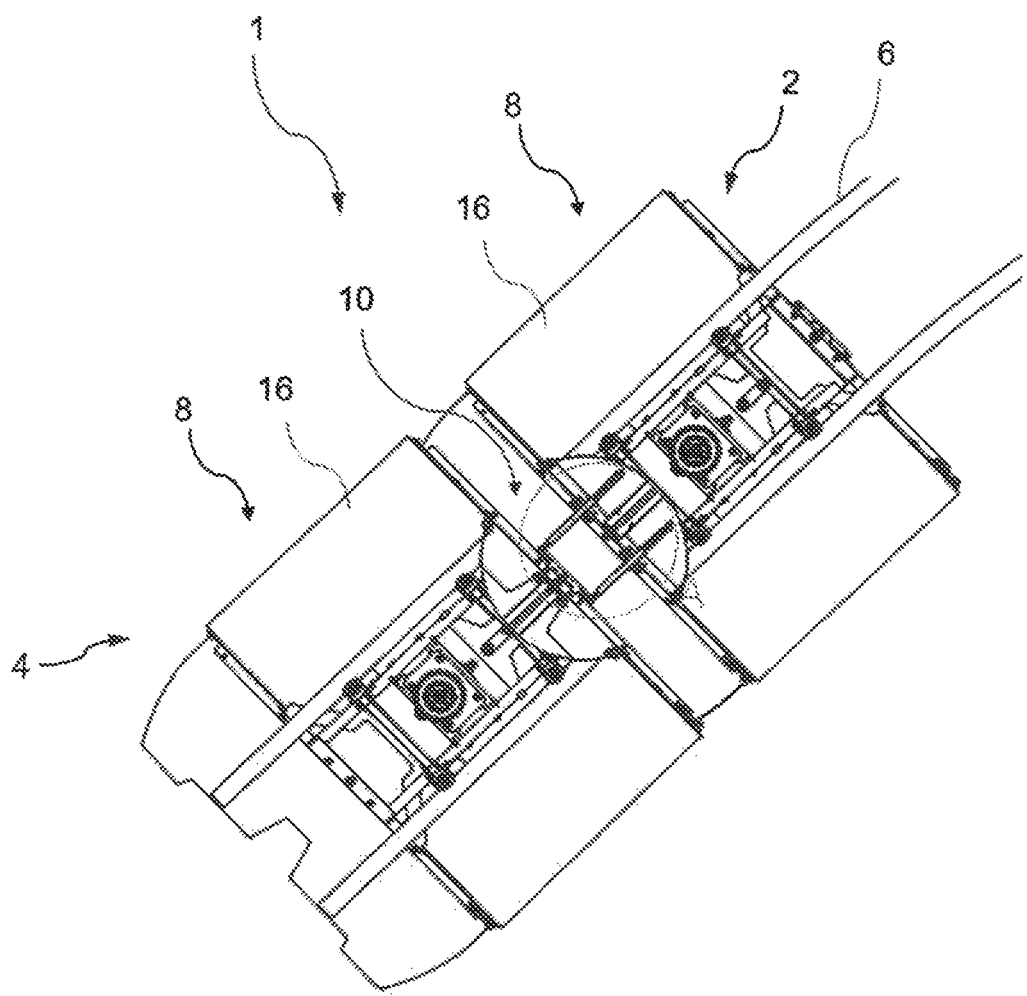
Figure 1:
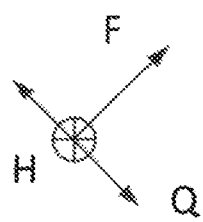

first conveyor carriage and a brake device is arranged on the second conveyor carriage. The brake device assumes the release state when the first and second conveyor carriage are traveling in a substantially straight manner, and the brake device assumes the brake state when at least one of the conveyor carriages is cornering in order to allow a movement of a cross belt of the cross belt conveyor in a cross conveyor direction (Q) when traveling in a straight manner and brake the movement when cornering.

13 Claims, 16 Drawing Sheets

(51) Int. Cl.
    *F16D 59/02*     (2006.01)
    *F16D 65/14*     (2006.01)
    *B65G 17/34*     (2006.01)
    *B65G 47/91*     (2006.01)
    *F16D 121/14*    (2012.01)
    *F16D 125/64*    (2012.01)
    *F16D 127/00*    (2012.01)

(52) U.S. Cl.
    CPC .......... *F16D 65/14* (2013.01); *F16D 2121/14* (2013.01); *F16D 2125/64* (2013.01); *F16D 2127/004* (2013.01)

(58) Field of Classification Search
    CPC ........... F16D 2125/64; F16D 2127/004; B60T 1/062; B60T 7/12
    USPC .................................................... 198/370.06
    See application file for complete search history.

(56) References Cited

U.S. PATENT DOCUMENTS

| | | | | |
|---|---|---|---|---|
| 5,701,992 | A * | 12/1997 | Enomoto | B65G 17/345 198/370.1 |
| 6,253,901 | B1 * | 7/2001 | Hintz | B65G 17/345 198/370.06 |
| 6,360,868 | B1 | 3/2002 | Arlt et al. | |
| 6,749,413 | B2 | 6/2004 | Fare' et al. | |
| 6,938,750 | B2 * | 9/2005 | Miller | B65G 23/23 198/370.06 |
| 7,080,725 | B2 * | 7/2006 | Hishinuma | B65G 17/345 198/370.1 |
| 8,033,379 | B2 * | 10/2011 | Syndikus | B65G 17/345 198/370.06 |
| 9,233,803 | B2 * | 1/2016 | Pilarz | B65G 17/345 |
| 9,708,128 | B2 * | 7/2017 | Parodi | B65G 47/945 |
| 2010/0101917 | A1 | 4/2010 | Baum et al. | |
| 2010/0213031 | A1 * | 8/2010 | Krech | B65G 54/02 198/574 |

FOREIGN PATENT DOCUMENTS

| | | |
|---|---|---|
| EP | 1041019 B1 | 6/2003 |
| EP | 3159288 A1 | 4/2017 |
| EP | 3170776 A1 | 5/2017 |
| GB | 2184416 A | 6/1987 |
| WO | WO-0224557 A1 | 3/2002 |
| WO | 2002/057161 A2 | 7/2002 |

OTHER PUBLICATIONS

First Office Action of corresponding Chinese application No. 2019800470277, dated Jun. 3, 2021, eight pages.
Notice of Non-Final Rejection of corresponding Korean application No. 10-2021-7004300, dated Jun. 22, 2021, three pages.

* cited by examiner

CONVEYOR DEVICE WITH AT LEAST TWO CONVEYOR CARRIAGES AND A POWERTRAIN BRAKE FOR A CROSS BELT CONVEYOR ON AT LEAST ONE OF THE CONVEYOR CARRIAGES

CROSS-REFERENCE TO RELATED APPLICATIONS

This application is a 371 U.S. National Phase of International Application No. PCT/EP2019/067999, filed Jul. 4, 2019, which claims priority to German Patent Application No. 10 2018 005 570.2, filed Jul. 13, 2018. The entire disclosures of the above applications are incorporated herein by reference.

The invention relates to a conveying device having at least two conveying carriages and having a drivetrain brake for a transverse-belt conveyor on at least one of the conveying carriages.

In the case of such a conveying device, at least one of the conveying carriages is equipped with a transverse-belt conveyor, that is to say with a transverse belt which is arranged and driveable transversely with respect to the conveying direction, and the conveying carriages are preferably used as an encircling carriage chain in order to pick up and convey items for high-speed distribution in postal and distribution centers. In the case of a conventional conveying device, it is common, in the case of the transverse-belt conveyor, to provide a separate drive source, fed with auxiliary energy, for driving the transverse belt. With this configuration, the transverse belt can, for example by means of suitable control of the drive source, be braked and/or blocked during travel around a curve in order to prevent material for conveying from falling from a conveying carriage and damage thus being caused to the material for conveying, to the conveying carriage and/or to the conveying device, or possibly a hazard being posed to persons involved.

However, the use of a transverse-belt conveyor, the transverse belt of which is driven without a drive source fed with auxiliary energy, offers considerable advantages, such as for example a simpler construction and no requirement for the auxiliary energy to be conducted to the one or more movable conveying carriages. In the case of such a transverse-belt conveyor, the transverse belt is for example supported by means of rollers and driven by means of a friction roller drive. Here, when the conveying carriage travels past a station at which the material for conveying is to be unloaded, the friction roller of said friction roller drive is driven by rolling on an element which is static in relation to the conveying carriage traveling past. With such a configuration, there is however the problem of achieving effective braking of the transverse belt during (horizontal) travel around a curve. In particular, there is the risk here that the transverse belt, owing to the weight of the material for conveying supported thereon and the resulting centrifugal force, the material for conveying is undesirably moved, such that the material for conveying can fall from the conveying carriage.

Against this background, it is an object of the invention to provide a conveying device with at least two conveying carriages and with a drivetrain brake for a transverse-belt conveyor on at least one of the conveying carriages, in the case of which conveying device a braking action on a drivetrain of the transverse-belt conveyor is improved, reliable operation of the transverse-belt conveyor is ensured, and the risk of material for conveying falling from the conveying carriage during travel around a curve is reduced.

The object is achieved by means of the subjects of the independent patent claims. Preferred embodiments emerge from the dependent claims.

One aspect relates to a conveying device having at least one first and one second conveying carriage which are arranged one behind the other in a conveying direction, a transverse-belt conveyor which is formed on at least the second conveying carriage and which serves for conveying material for conveying in a transverse conveying direction oriented substantially transversely with respect to the conveying direction, and a drivetrain brake for the transverse-belt conveyor. The drivetrain brake has a brake apparatus and an operating apparatus for the brake apparatus, wherein the operating apparatus is arranged on the first conveying carriage and the brake apparatus is arranged on the second conveying carriage. The brake apparatus can be placed into a braking state in which the brake apparatus exerts a braking force on an element of a drivetrain of the transverse-belt conveyor, and can be placed into a release state, in which the brake apparatus exerts no or a reduced braking force on an element of a drivetrain of the transverse-belt conveyor. The operating apparatus and the brake apparatus interact such that, during substantially straight-ahead travel of the first and second conveying carriage, the brake apparatus assumes the release state and, during travel of at least one of the conveying carriages around a curve, the brake apparatus assumes the braking state, in order to allow a movement of a transverse belt of the transverse-belt conveyor in the transverse conveying direction during straight-ahead travel and to brake such a movement during travel around a curve.

One advantage of the aspect is that, during straight-ahead travel, reliable operation of the conveying device with precise unloading of material for conveying on the transverse-belt conveyor is not impeded by the drivetrain brake, and is thus ensured. There is also no longer the risk that material for conveying on the conveying carriage with the transverse-belt conveyor drives the transverse belt owing to the centrifugal force acting on the material for conveying during travel around a horizontal curve, and is thus conveyed toward the outside of the curve in an undesired manner, and can possibly fall from the conveying carriage.

A further advantage of the present invention is that an improved braking action on the drivetrain of the transverse-belt conveyor can be attained without increased wear of the transverse belt and/or without the use of auxiliary energy. The present invention makes use in particular of the fact that the conveying carriage, that is to say also the brake apparatus and operating apparatus respectively arranged thereon, undergo a predetermined or predeterminable relative displacement or a relative offset with respect to one another during travel around a curve, whereby the operating apparatus can actuate the brake apparatus.

The conveying device may have multiple conveying carriages for transporting material for conveying in a conveying direction. It is possible for all conveying carriages of the conveying device to each have both a brake apparatus and an operating apparatus, wherein the series or chain of conveying carriages arranged one behind the other may form a closed ring along the transport path. The conveying device may, over the course of its transport path, comprise a non-straight horizontal curve section and/or vertical curve section, that is to say left-hand and right-hand curves and uphill and downhill sections, possibly in combination. The transport path or the conveying direction may be defined by transport rails, on which the conveying carriages are arranged so as to be movable in the conveying direction by means of rollers or wheels. For the drive of the conveying carriages, the conveying carriages may each be connected to a drive chain which circulates, substantially following the course of the transport path. The spacing between the conveying carriages in the conveying direction is thus predetermined or predeterminable.

The conveying carriage of the conveying device may, for the purposes of transporting the material for conveying, have a conveying surface which is formed so as to be substantially perpendicular to a direction of gravitational force and on which the material for conveying can be set down owing to the gravitational force acting on the material for conveying and can thus be transported by means of the conveying carriage. In the case of multiple conveying carriages in the conveying device, at least one of the conveying carriages has a transverse-belt conveyor for conveying material for conveying in a direction transverse with respect to the conveying direction of the conveying device.

A conveying plane is defined by the conveying surface, which lies in the conveying plane.

The transverse-belt conveyor may be provided for unloading material for conveying in a transverse conveying direction which is transverse with respect to the conveying direction of the conveying device, wherein the transverse belt of the transverse-belt conveyor can be driven in the respectively desired transverse conveying direction, in particular to the left or to the right.

The drivetrain brake may be a brake which acts on an element of a drivetrain of the transverse-belt conveyor.

The drivetrain of the transverse-belt conveyor may have the transverse belt, at least one friction roller and at least one counterpressure roller. In order to drive the transverse belt, the counterpressure roller may be arranged as one of the rollers between the diverting rollers, wherein the transverse belt is clamped between the counterpressure roller and the friction roller arranged parallel to the counterpressure roller. If the friction roller is driven so as to rotate clockwise, for example, it is thus the case that the transverse belt is driven counterclockwise. Further elements of the drivetrain, for example one or more diverting elements and/or gearing elements, which effect a speed increase or speed reduction, may be connected upstream of the friction roller.

The interaction of two or more components and/or assemblies within the context of the present invention is to be understood, on the one hand, to mean an active action of one component/of one assembly on the other. On the other hand, this is also to be understood to mean that one component/one assembly releases, or moves away from, the other, for example in order to allow a preload of the other component/of the other assembly to take effect.

The conveying direction is the direction in which the conveying carriages move in the conveying device. In this description, in the case of multiple conveying carriages, consideration is basically given to the conveying direction of the conveying carriage with the transverse belt, which is braked by the brake apparatus, of the transverse conveyor.

The transverse conveying direction is the direction in which the transverse belt is driven, wherein the transverse conveying direction is oriented perpendicular to the conveying direction and lies in the conveying plane or is oriented parallel to the conveying plane. In this description, in the case of multiple conveying carriages formed with transverse conveyors, consideration is basically given to the transverse conveying direction of the transverse conveyor with the transverse belt that is to be braked.

If the conveying carriage travels to the right/to the left/upward/downward, the movement of the conveying carriage, and thus in particular also the movement of the operating apparatus and of the brake apparatus, may result from a superposition of multiple movement directions, in particular both translational and rotational movements. In the present description, it is intended to give consideration only to the respectively prevailing movement direction, however, for example in the conveying direction or in the transverse conveying direction.

A transverse offset of the conveying carriages is a translational offset of the conveying carriages with respect to one another in the transverse conveying direction. In the case of a transverse offset of the conveying carriages with respect to one another, the conveying carriages are not oriented one behind the other in the conveying direction.

An angular offset of the conveying carriages is a rotational offset of the conveying carriages with respect to one another with an angle which lies in the conveying plane or which is oriented parallel to the conveying plane. In other words, in the case of an angular offset, the conveying carriages have orientations which deviate from one another by an angle, wherein the angle lies in the conveying plane or is oriented parallel to the conveying plane. In the case of an angular offset of the conveying carriages with respect to one another, the conveying carriages are likewise not oriented exactly one behind the other in the conveying direction.

During straight-ahead travel, the conveying carriages are oriented substantially one behind the other in the conveying direction. During travel of at least one of the conveying carriages around a curve, the conveying carriages typically have both a transverse offset and an angular offset with respect to one another, in a manner dependent on the course of the curve.

The brake apparatus and the operating apparatus are in particular mechanical apparatuses which mechanically interact merely as a result of the relative arrangement and displacement with respect to one another. The braking state can be defined as the state in which the brake apparatus exerts at least a predetermined or predeterminable braking force on the element of the drivetrain of the transverse-belt conveyor. The release state can be defined as the state in which the brake apparatus exerts substantially no braking force on the element of the drivetrain of the transverse-belt conveyor. The brake apparatus can also assume states, or be placed into states, which lie between the braking state and the release state.

In the context of the present invention, the expressions "rear" or "behind" and the like used below mean a direction counter to the conveying direction of the conveying device and/or a position of an element relative to another element in relation to the conveying direction. In the context of the present invention, the expressions "front" or "in front of" and the like used below mean a direction in the conveying direction of the conveying device and/or a position of an element relative to another element in relation to the conveying direction.

Preferably, the first conveying carriage with the operating apparatus arranged thereon may be arranged so as to travel ahead, in the conveying direction, of the second conveying carriage with the brake apparatus.

In other words, the second conveying carriage with the brake apparatus may be arranged so as to follow, in the conveying direction, the first conveying carriage with the operating apparatus arranged thereon.

With this configuration, the drivetrain brake can be activated already when the first conveying carriage, which is traveling ahead, is at the start of a curve and the second conveying carriage, which is following and which has the transverse belt to be braked, is still a short distance away from traveling through the curve, that is to say is presently still traveling straight ahead. The following conveying carriage can thus enter the curve with the transverse belt having already been braked.

As an alternative to this, the first conveying carriage with the operating apparatus arranged thereon may be arranged so as to follow, in the conveying direction, the second conveying carriage with the brake apparatus. In other words, it is alternatively possible for the brake apparatus to be provided on the second conveying carriage, which travels ahead in the conveying direction, and for the operating apparatus to be provided on the first conveying carriage, which follows in the conveying direction.

The brake apparatus may preferably have a first brake lever with a first friction element arranged thereon, wherein the first brake lever is mounted pivotably on the second conveying carriage.

It is furthermore preferably possible, in the braking state of the brake apparatus, for the first brake lever to be pivoted such that the first friction element is pressed against the element of the drivetrain.

The drivetrain brake may preferably have at least one elastic element, by means of the spring force of which the first brake lever is pivoted in the braking state. The expressions "braking state" and "release state" used in this description relate both to the corresponding states of the operating apparatus, of the brake apparatus and also to those of the first brake lever. The elastic element may for example be in the form of a pressure spring.

Here, the elastic element may be installed at least in a play-free manner in the drivetrain brake. The elastic element is preferably even installed in a preloaded manner within a component of the drivetrain brake, more specifically of the brake apparatus. In the case of the at least play-free arrangement of the elastic element, the braking action can take effect immediately in the event of deflection of at least one of the two conveying carriages. In the case of the elastic element being arranged in a preloaded manner within a component of the brake apparatus, the braking action can (in a manner dependent on the respective configuration and number of elastic elements) take effect immediately in an intensified manner in the event of deflection of at least one of the two conveying carriages, that is to say the brake lever can be quickly pressed with force against the braked element of the drivetrain. Here, the elastic element may be braced within a component of the brake apparatus without load in relation to the operating apparatus and/or the conveying carriage traveling ahead. This allows the braking action to take effect quickly. The component of the brake apparatus may be of elongate form, for example in the form of a tension rod and/or plunger. Here, the elastic element may in particular be preloaded in relation to a shoulder and/or some other obstruction on the elongate component in order to reduce a load on the operating apparatus.

It is furthermore preferably possible for the element of the drivetrain to be a counter pressure roller for a friction roller for driving the transverse belt.

For example, the counter pressure roller may be formed with a galvanized steel tube. Together with the friction element, which is formed for example as a rubber friction lining, it is possible on the one hand to realize a drivetrain brake which exhibits little wear, and on the other hand to generate an adequate braking force on the counterpressure roller. An adequate braking force may for example lie in the range of approximately 200 N. The axis of the counterpressure roller may be oriented substantially in the conveying direction. The counterpressure roller may be arranged substantially centrally in a transverse direction of the conveying carriage. The axial length of the counterpressure roller may be set to be longer than the width of the transverse belt in the conveying direction and/or longer than the axial length of the diverting rollers of the transverse-belt conveyor, such that the friction element can be more easily placed in contact with the counterpressure roller.

It is advantageously possible for a defined braking force to be attained by means of predeterminable effective lever lengths at the first brake lever.

Preferably, the first brake lever may be attached with exactly one rotational degree of freedom, about a vertical axis which is oriented perpendicular to the conveying direction and perpendicular to the transverse conveying direction, and without a translational degree of freedom, to the second conveying carriage. A fixed center of rotation is thus defined about which the first brake lever is pivotable into a braking state and/or into a release state.

It is furthermore preferably possible for the brake lever to be pivotable by means of the operating apparatus into the braking state and/or into the release state.

In other words, the operating apparatus can actively place the brake apparatus into the braking state or into the release state, for example pivot the first brake lever into the braking state or into the release state, by virtue of the operating apparatus exerting a force on the brake apparatus and/or on the brake lever, depending on the arrangement of the conveying carriages relative to one another.

Alternatively or in addition to this, it may be possible for the brake apparatus to be placed into the braking state passively, for example by means of a release of the correspondingly preloaded first brake lever by the operating apparatus. Furthermore, the operating apparatus may actively place the brake apparatus into the release state, for example pivot the first brake lever into the release state.

The drivetrain brake may preferably be configured such that the brake apparatus is placed into the braking state by means of the operating apparatus in the presence of a transverse offset and/or angular offset of the conveying carriages with respect to one another.

In other words, the drivetrain brake may be configured such that the operating apparatus actively places the brake apparatus into the braking state when the conveying carriages have a transverse offset or an angular offset with respect to one another, for example by pivoting of the first brake lever into the braking state when the conveying carriages have a transverse offset or an angular offset with respect to one another.

Alternatively or in addition to this, the drivetrain brake may be configured such that the brake apparatus is placed into the braking state passively, for example by means of a release of the correspondingly preloaded first brake lever by the operating apparatus, when the conveying carriages have a transverse offset or an angular offset with respect to one another. Furthermore, the operating apparatus may actively place the brake apparatus into the release state, for example pivot the first brake lever into the release state, when the conveying carriages do not have transverse offset or angular offset with respect to one another.

The drivetrain brake may preferably be configured such that the operating apparatus places the brake apparatus into the release state in the absence of a transverse offset and angular offset of the conveying carriages with respect to one another.

In other words, the drivetrain brake may be configured such that the operating apparatus places the brake apparatus, in particular actively, into the release state when the conveying carriages are oriented with one another, that is to say when the two conveying carriages have the same orientation in the conveying plane.

In other words again, the brake apparatus may be operable by means of a transverse movement of the operating apparatus, that is to say a movement of the operating apparatus with at least one component in the transverse conveying direction, in relation to the brake apparatus and/or by means of an angular offset of the conveying carriages with respect to one another. The angular offset between the conveying carriages parallel to the conveying plane that arises during travel of the conveying carriages around a curve gives rise to a transverse movement of the operating apparatus and/or an angular offset of the operating apparatus parallel to the conveying plane in relation to the brake apparatus. The directional component of the transverse movement and/or of the angular offset in the transverse conveying direction can be utilized to activate or deactivate the drivetrain brake, in other words to operate the brake apparatus.

The brake apparatus may preferably have, in addition to the first brake lever, a second brake lever with a second friction element arranged thereon. It is thus possible for a braking force in a second direction to be generated on the element of the drivetrain.

It is furthermore preferably possible for the first brake lever to be formed as a single piece with the second brake lever, that is to say the first and second brake levers are constituent parts of the same component. It is thus possible to attain a reduction of the components of the brake apparatus and/or a simplification of the assembly of the brake apparatus.

The features described with regard to the first brake lever, and the associated characteristics, can also apply to the second brake lever. This may apply both to the embodiments in which the first and second brake levers are formed as a single piece and to embodiments in which the first and second brake levers are formed as constituent parts of separate components of the brake apparatus.

The first and second brake levers may preferably be arranged on mutually opposite sides of the element of the drivetrain. It is thus possible to attain asymmetrical design and/or a reduction of a structural height of the brake apparatus.

The first and second brake levers which are formed as a single piece with one another are preferably formed so as to be mirror-symmetrical with respect to one another as viewed in the conveying direction.

The operating apparatus may preferably have one or operating elements which is or are attached with in each case at least two rotational degrees of freedom, about the vertical axis and about the transverse conveying direction, and with exactly one translational degree of freedom, which in the release state is oriented approximately parallel to the conveying direction, to the first conveying carriage. It is thus possible, on the one hand, for the transverse movement and/or the angular offset between the first and second conveying carriages to be compensated, and thus for the operating apparatus and/or the brake apparatus to be protected against damage. On the other hand, it is however also possible for the transverse movement and/or the angular offset between the first and second conveying carriages, and thus between the operating apparatus and the brake apparatus, to be utilized for the controlled activation and/or deactivation of the drivetrain brake.

Alternatively or in addition to this, the operating apparatus may have one or more operating elements which is or are attached with in each case three rotational degrees of freedom and exactly one translational degree of freedom, which in the release state is oriented approximately parallel to the conveying direction, to the first conveying carriage.

The operating apparatus may preferably have an operating element which is attached without a degree of freedom to the first conveying carriage. Thus, depending on the configuration of the operating element, it is possible to attain a reliable transmission of the transverse movement and/or of the angular offset between the first and second conveying carriages and thus between the operating apparatus and the brake apparatus for the activation or deactivation of the drivetrain brake, while allowing structural alternatives.

One aspect relates to a drivetrain brake for a transverse-belt conveyor of a conveying device having at least one first and one second conveying carriage which are arranged one behind the other in a conveying direction, and having the transverse-belt conveyor which is formed on at least the second conveying carriage and which serves for conveying material for conveying in a transverse conveying direction oriented substantially transversely with respect to the conveying direction. Here, the drivetrain brake has a brake apparatus and an operating apparatus for the brake apparatus, wherein the operating apparatus is arranged on the first conveying carriage and the brake apparatus is arranged on the second conveying carriage. The brake apparatus can be placed into a braking state in which the brake apparatus exerts a braking force on an element of a drivetrain of the transverse-belt conveyor, and can be placed into a release state, in which the brake apparatus exerts no or a reduced braking force on an element of a drivetrain of the transverse-belt conveyor. The operating apparatus and the brake apparatus interact such that, during substantially straight-ahead travel of the first and second conveying carriage, the brake apparatus assumes the release state and, during travel of at least one of the conveying carriages around a curve, the brake apparatus assumes the braking state, in order to allow a movement of a transverse belt of the transverse-belt conveyor in the transverse conveying direction during straight-ahead travel and to brake such a movement during travel around a curve.

The statements made with regard to the aspect described further above apply to this aspect also.

Figure 2:
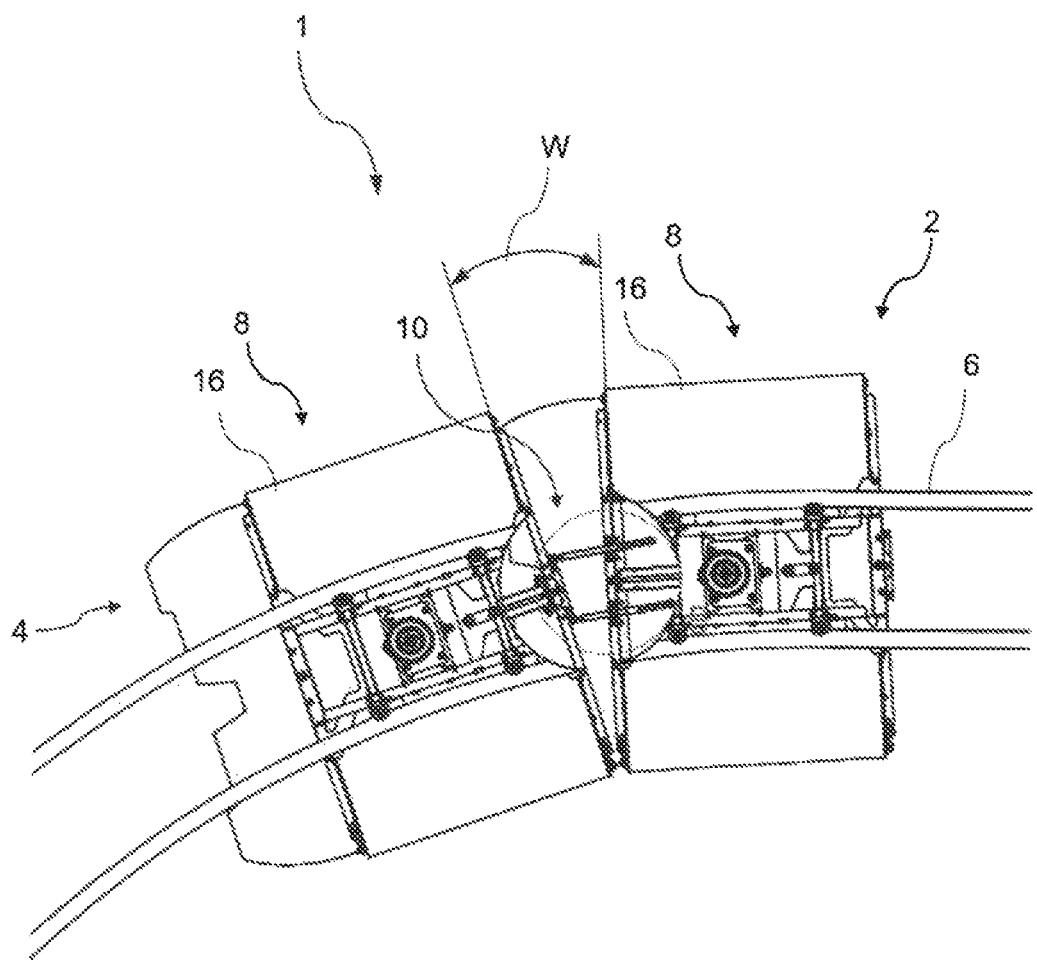
Figure 2:
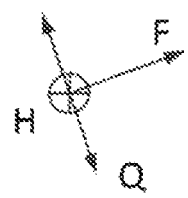
Figure 3:
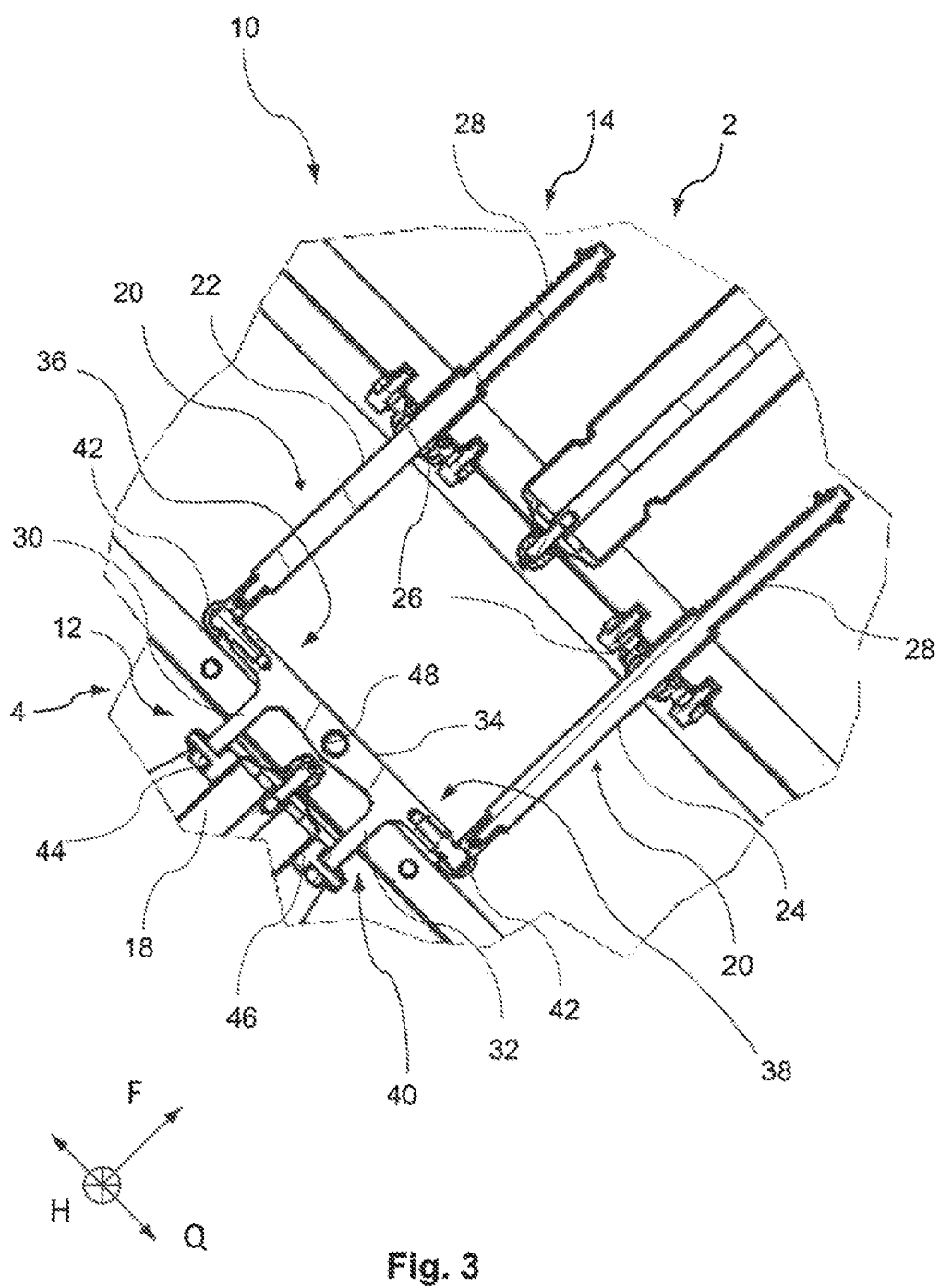
Figure 4:
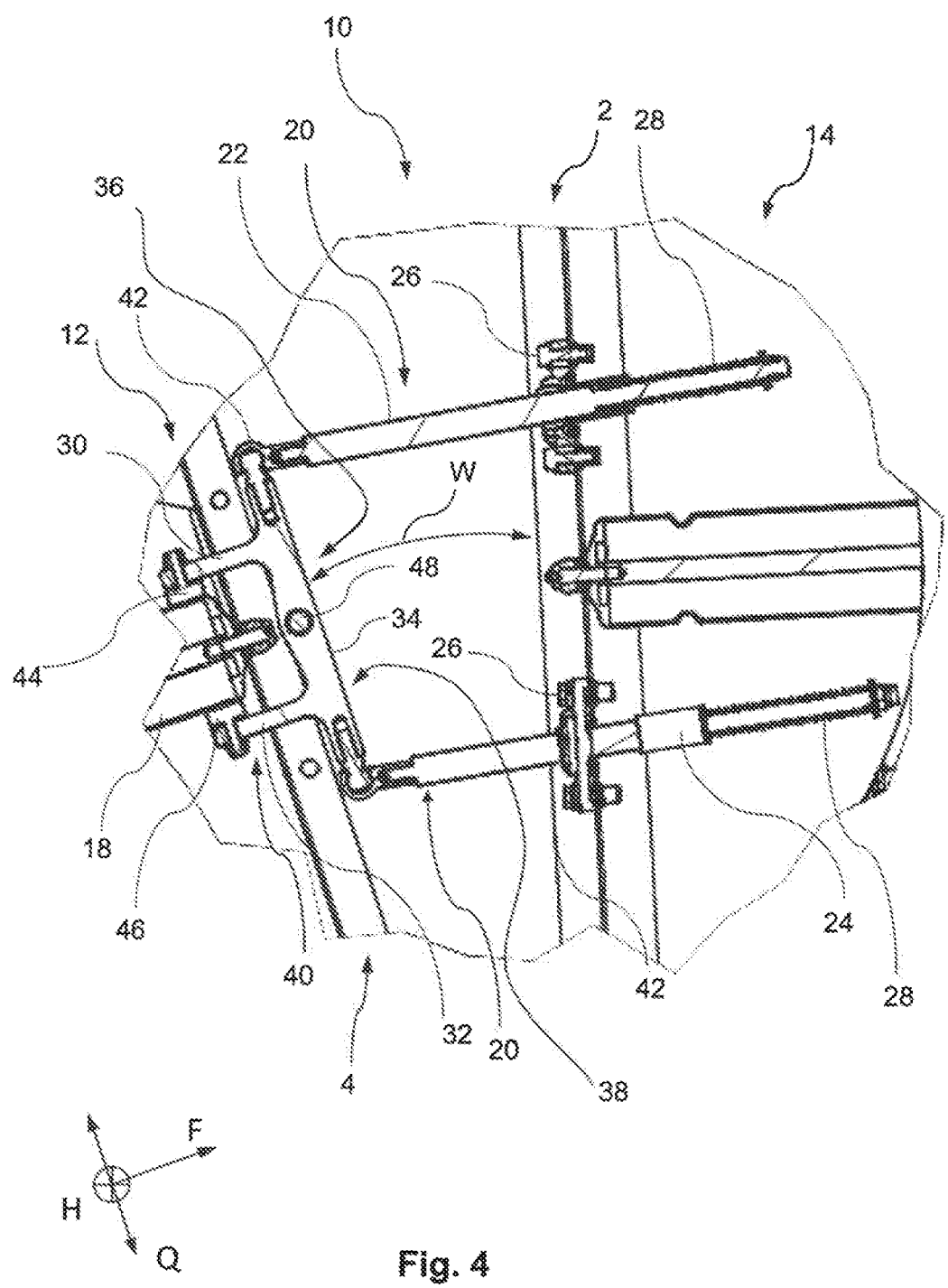
Figure 5:
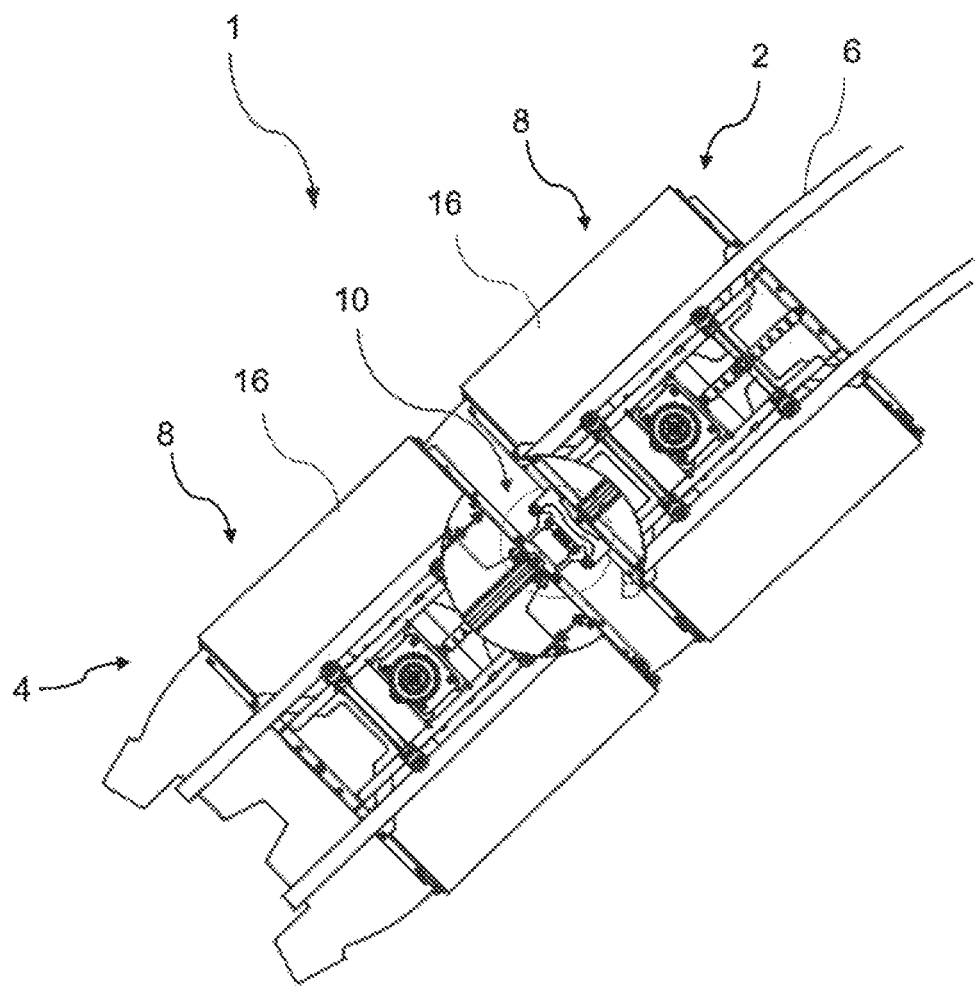
Figure 5:
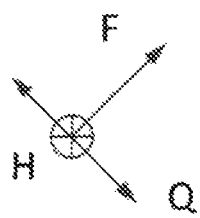
Figure 6:
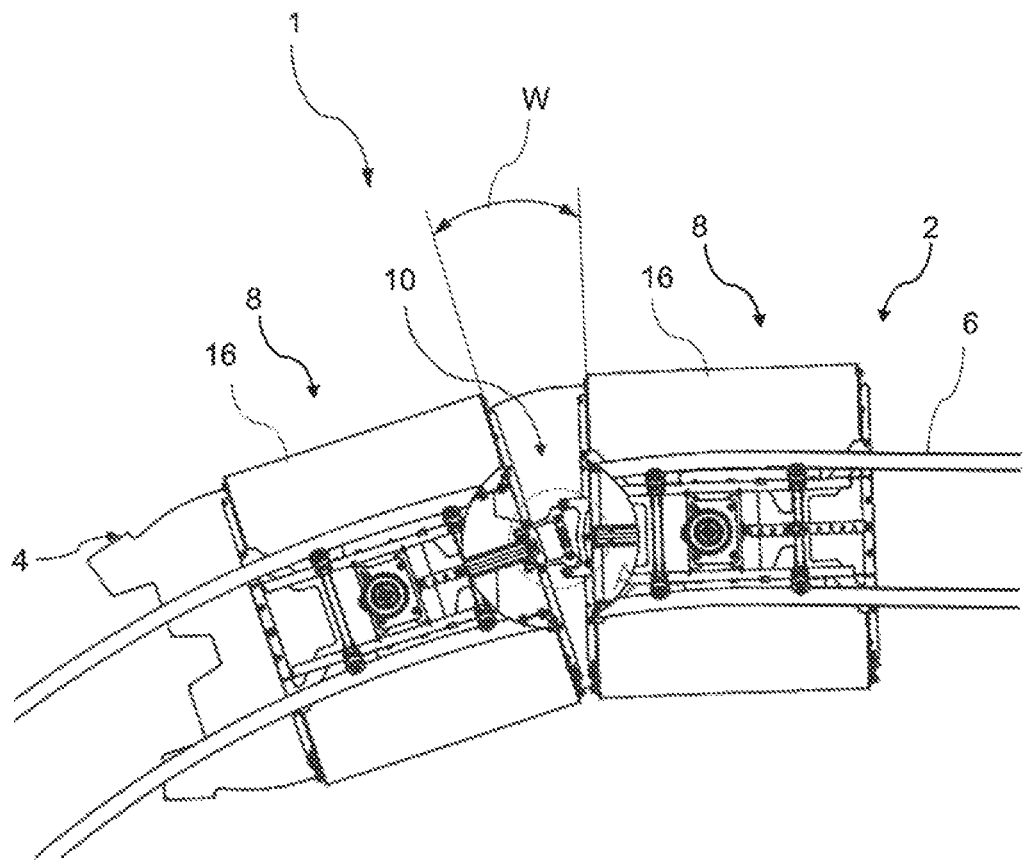
Figure 6:
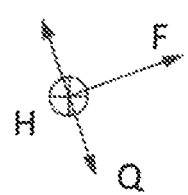
Figure 7:
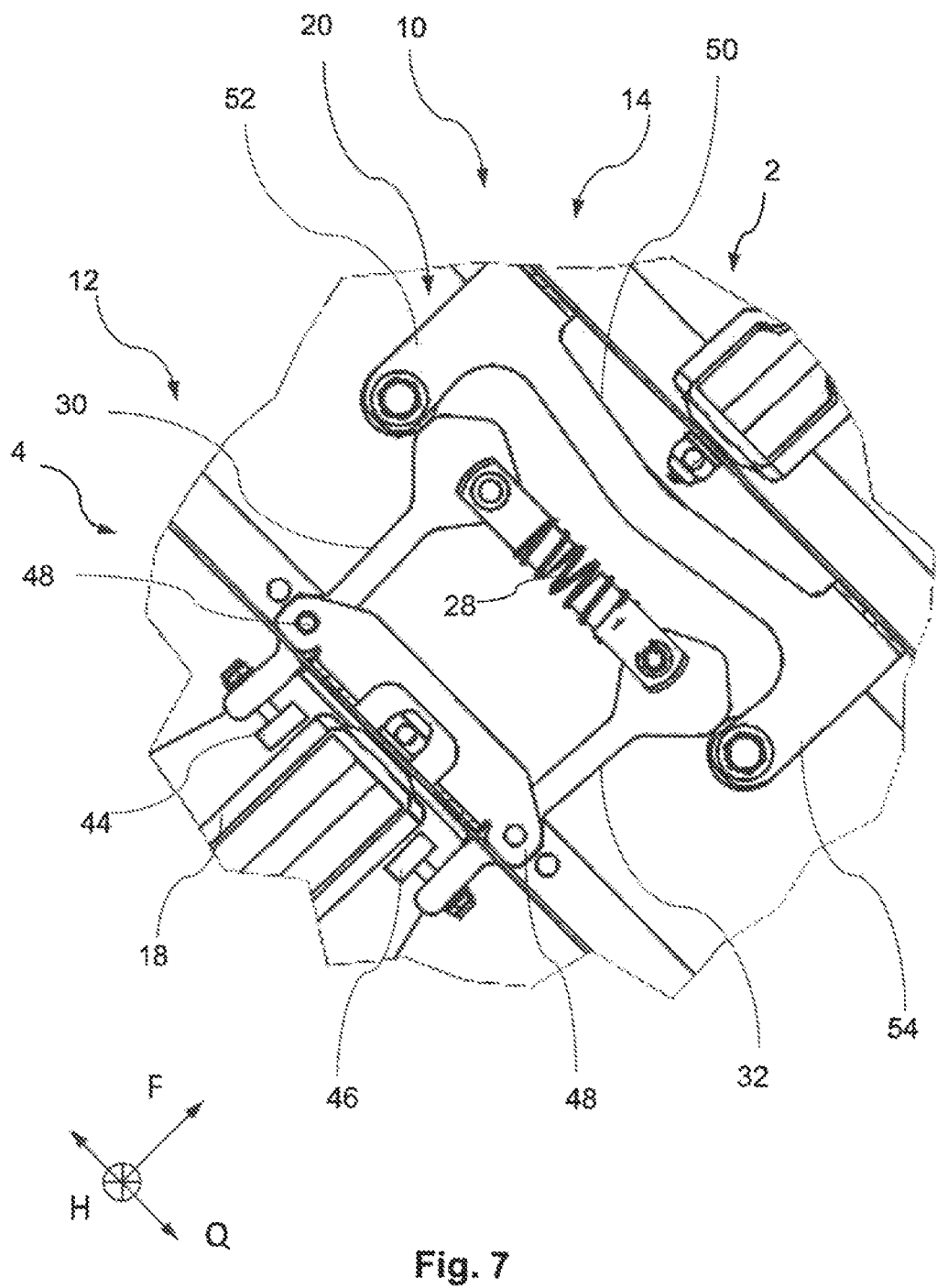
Figure 8:
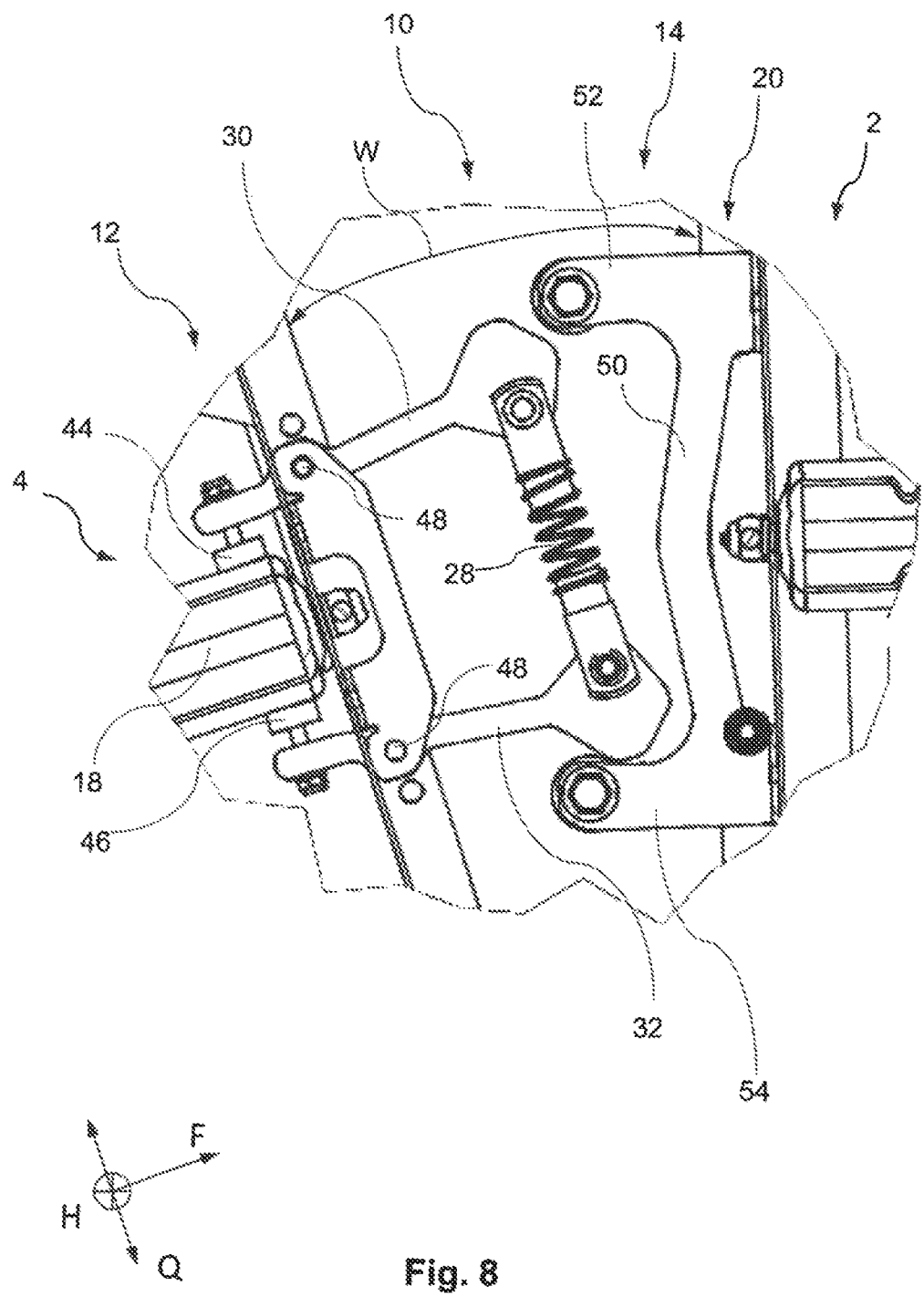
Figure 9:
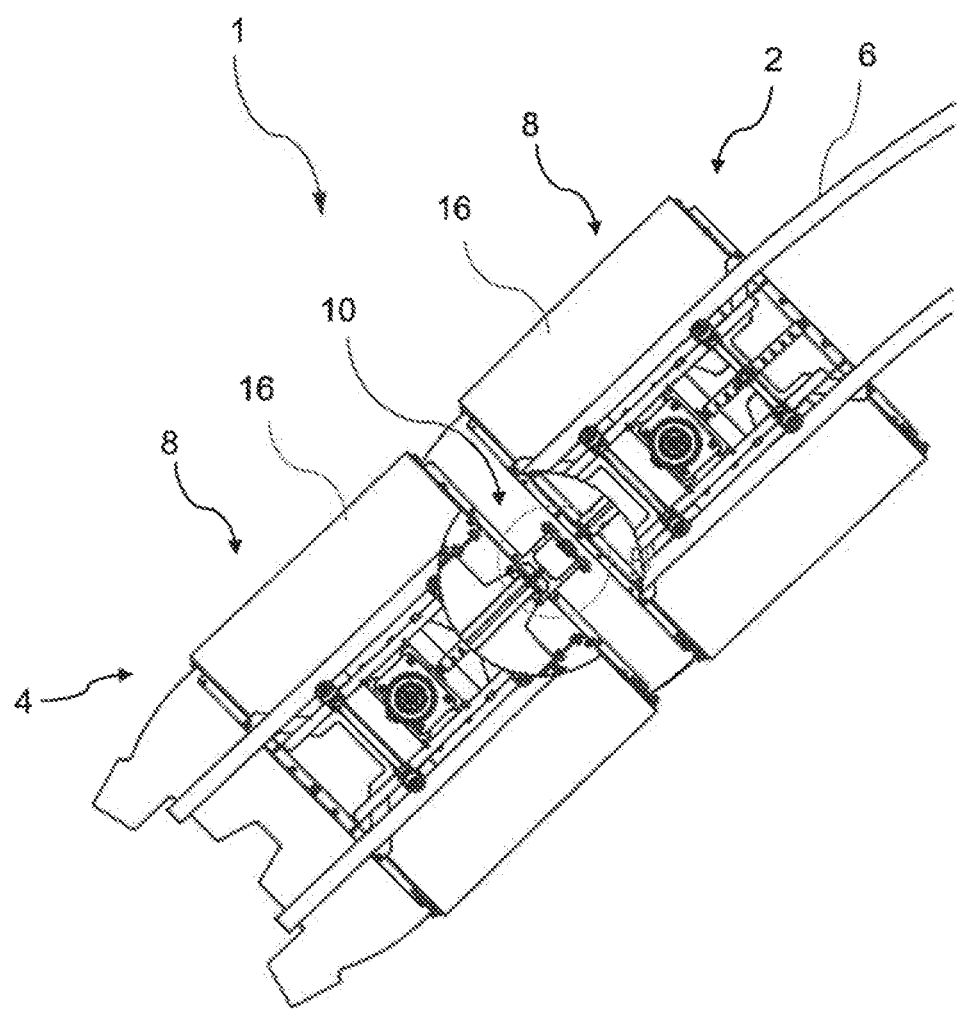
Figure 9:
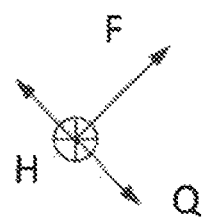
Figure 10:
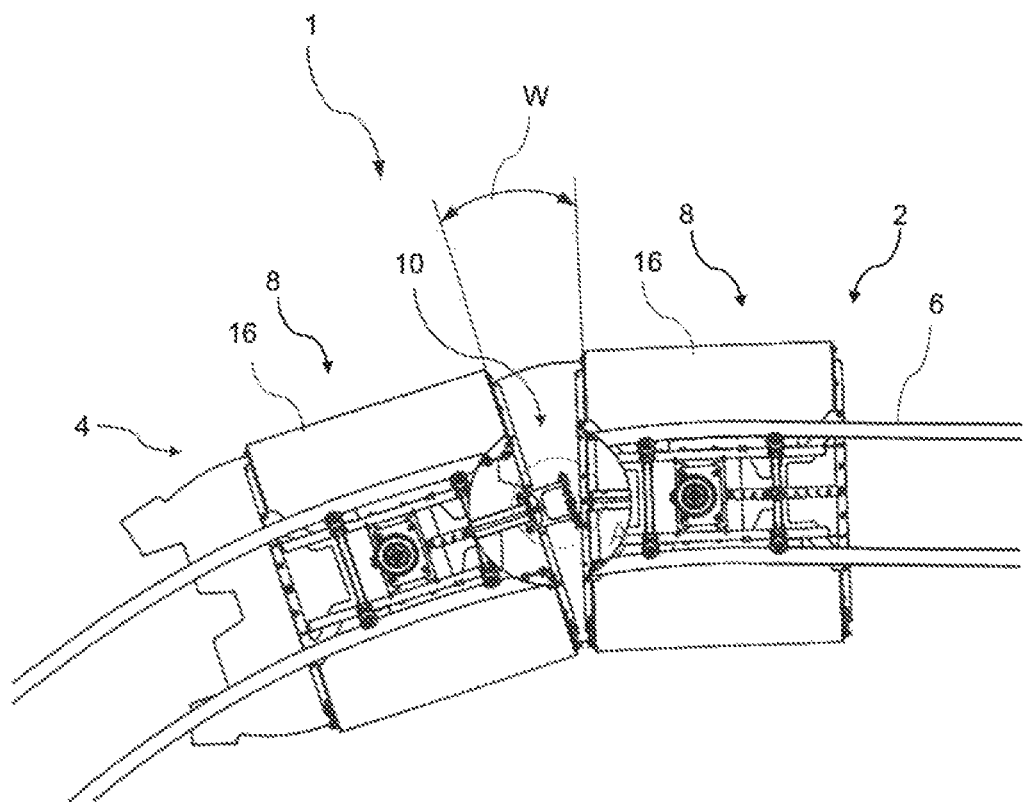
Figure 10:
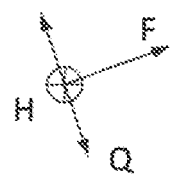
Figure 11:
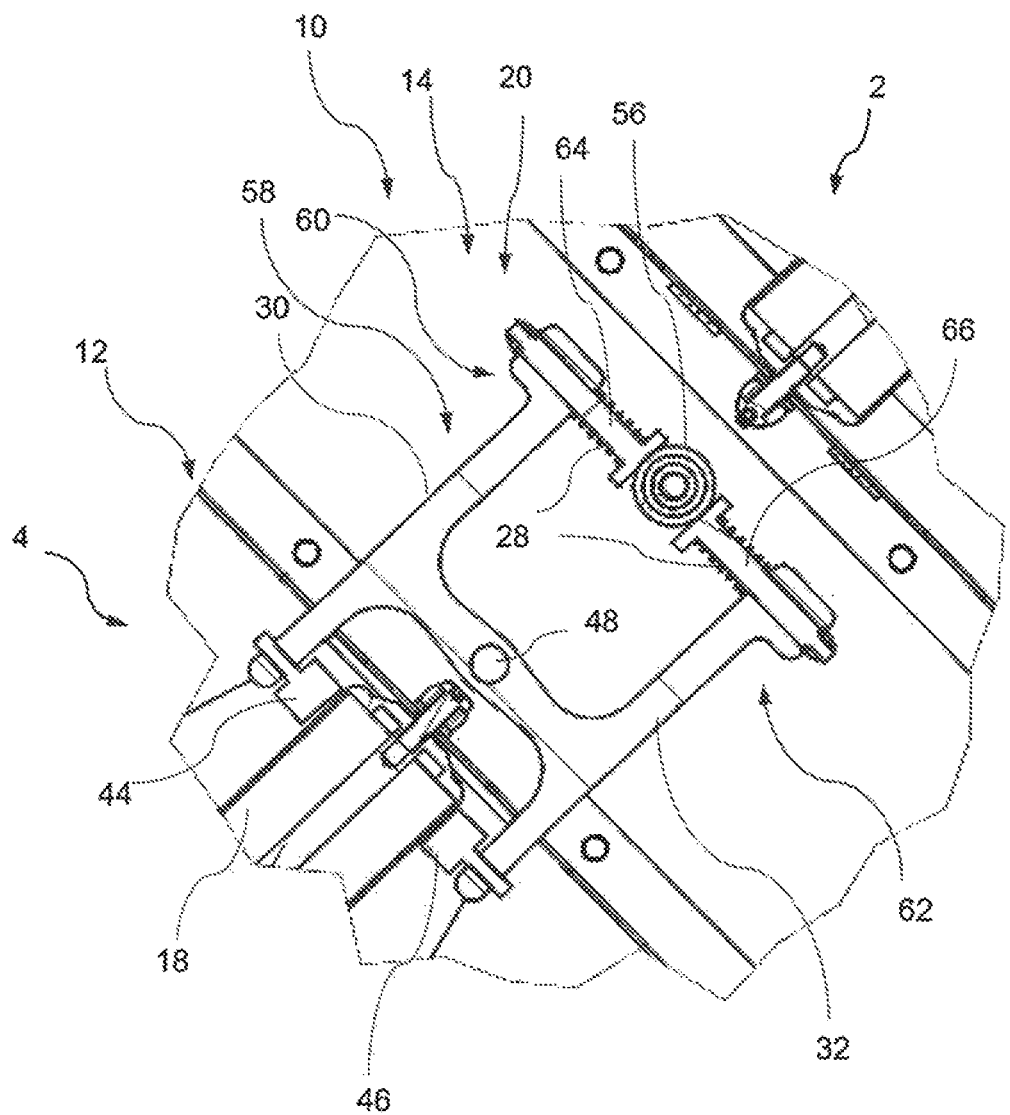
Figure 11:
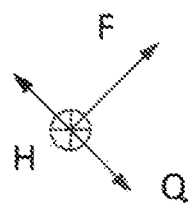
Figure 12:
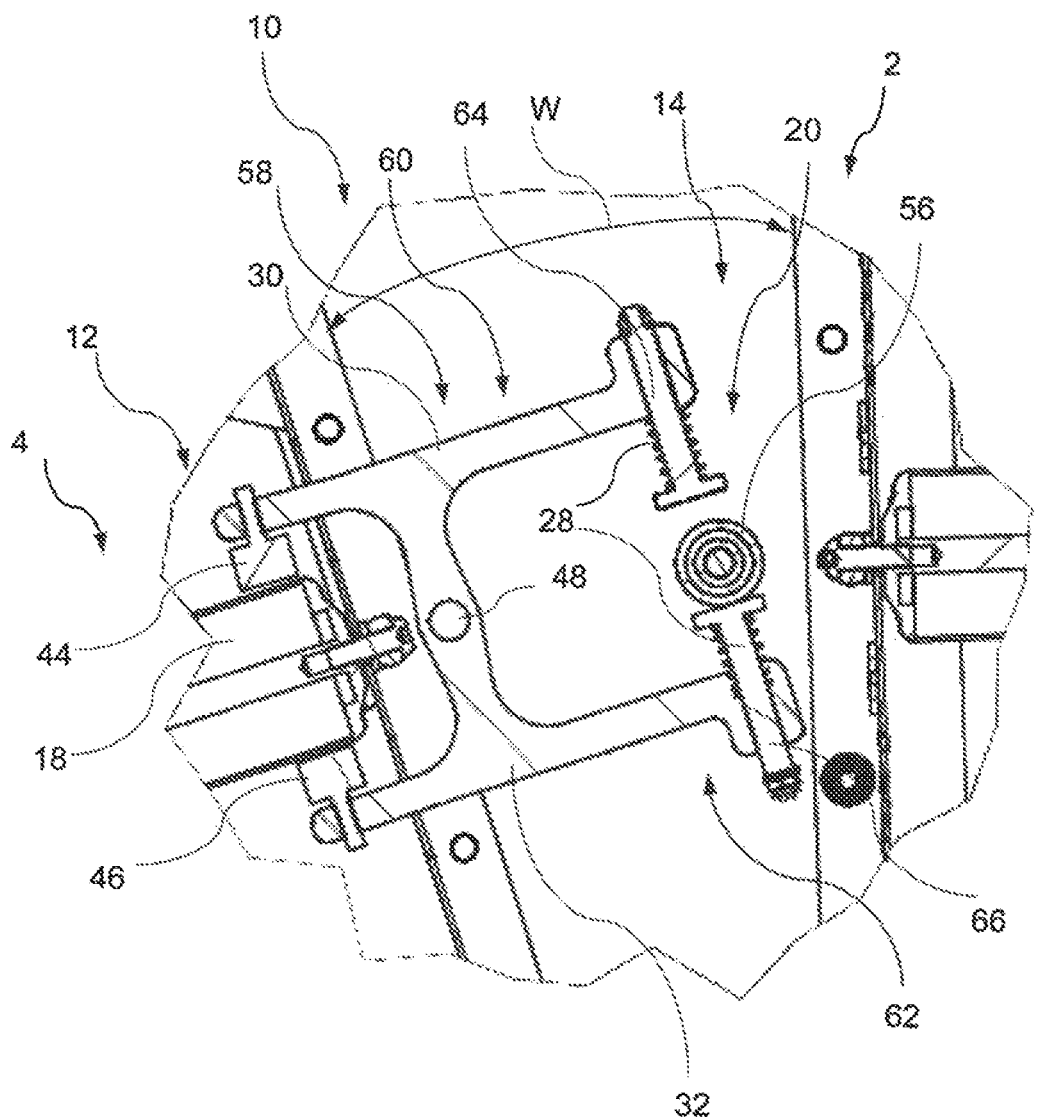
Figure 12:
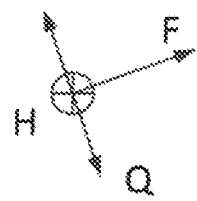
Figure 13:
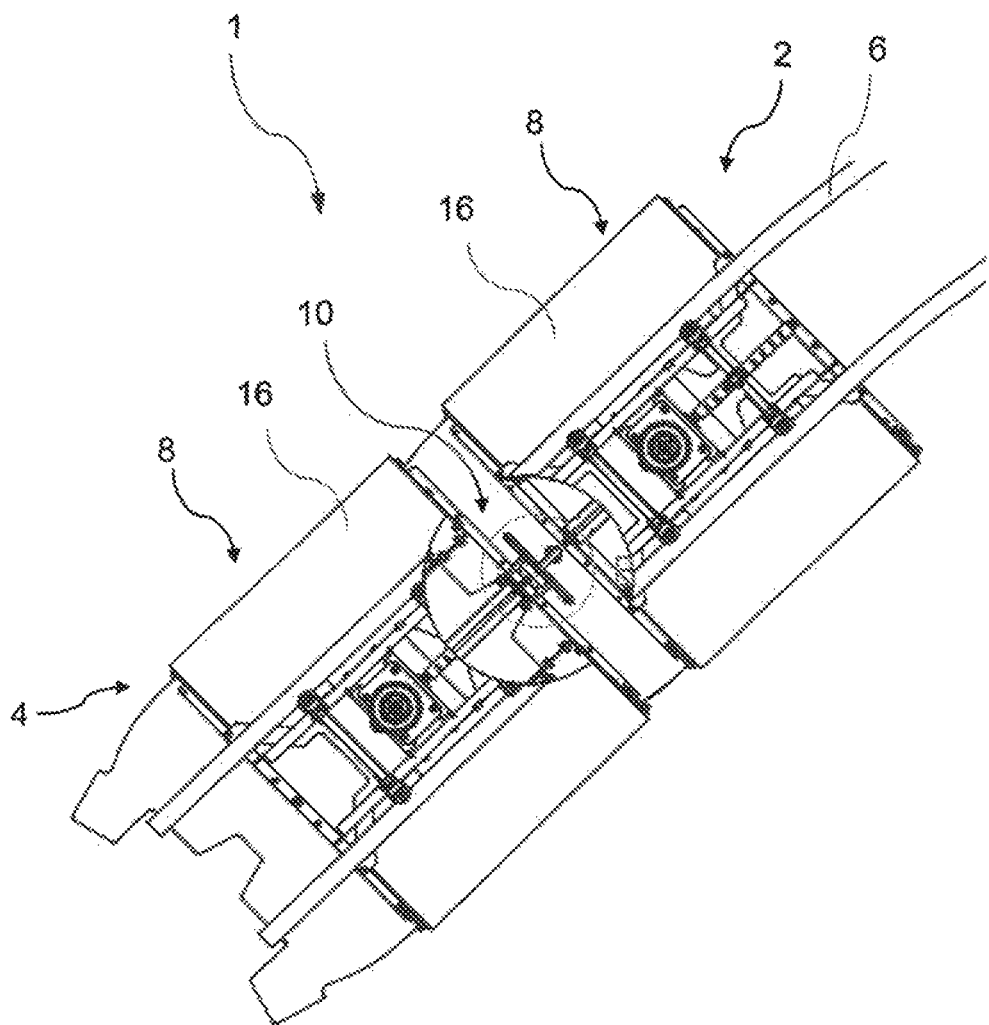
Figure 13:
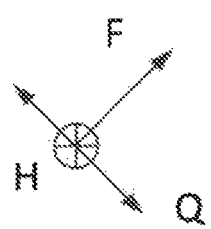
Figure 14:
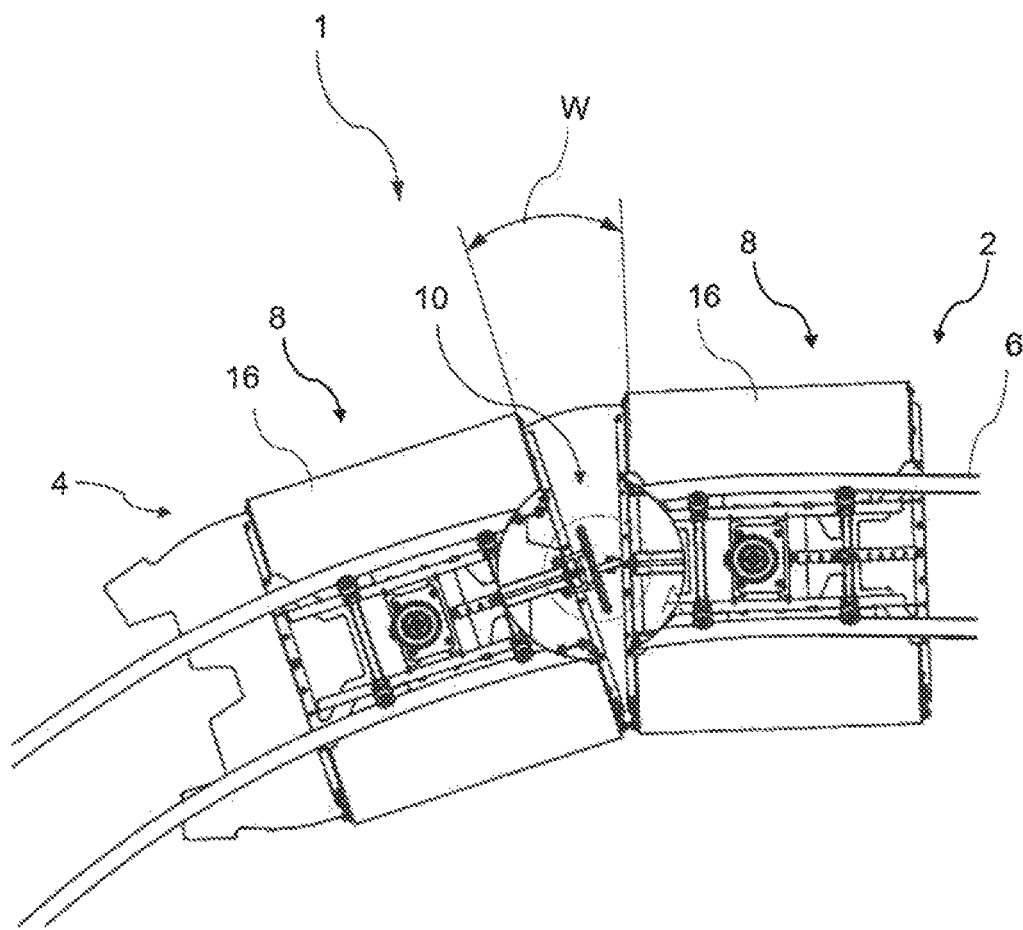
Figure 14:
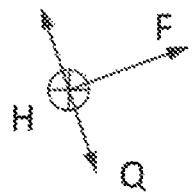
Figure 15:
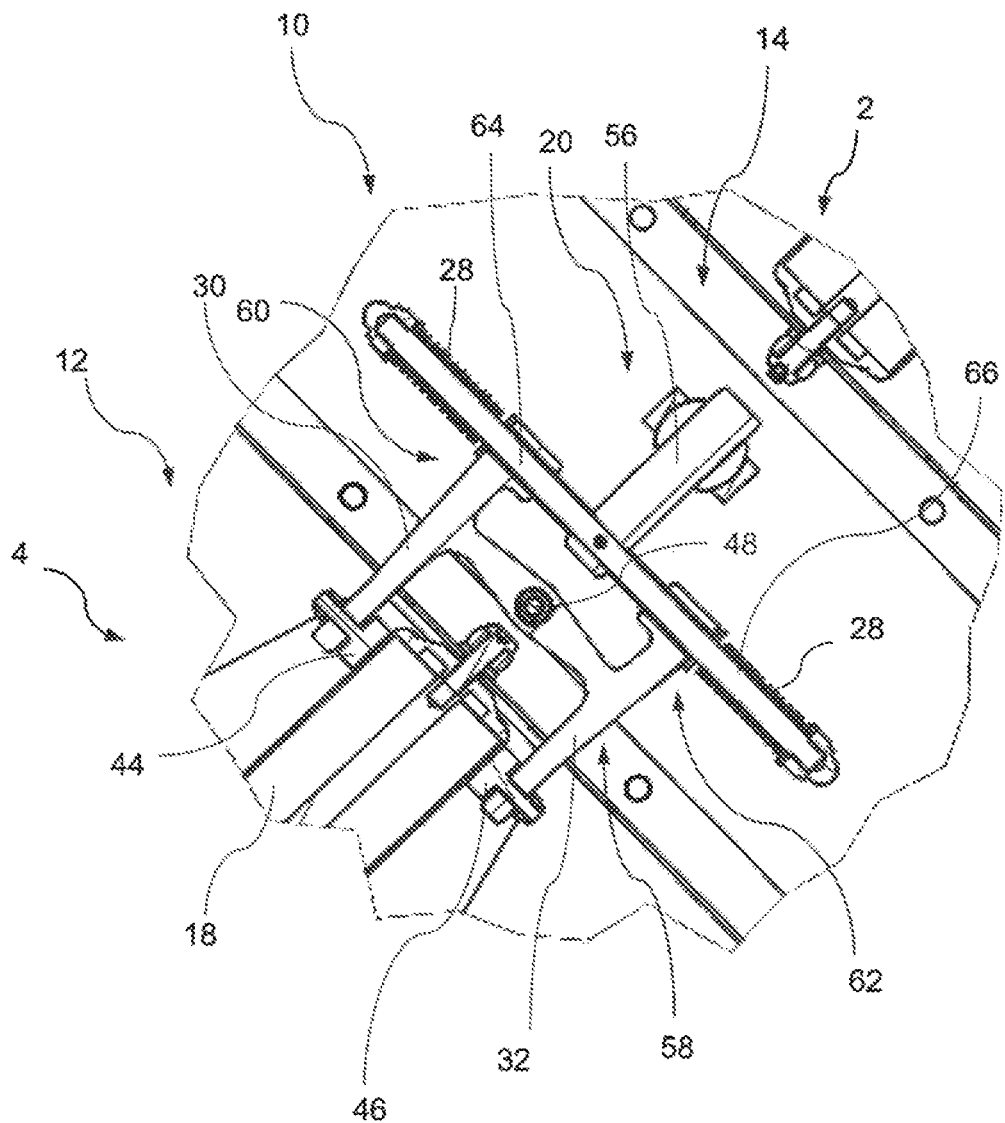
Figure 15:
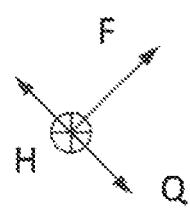
Figure 16:
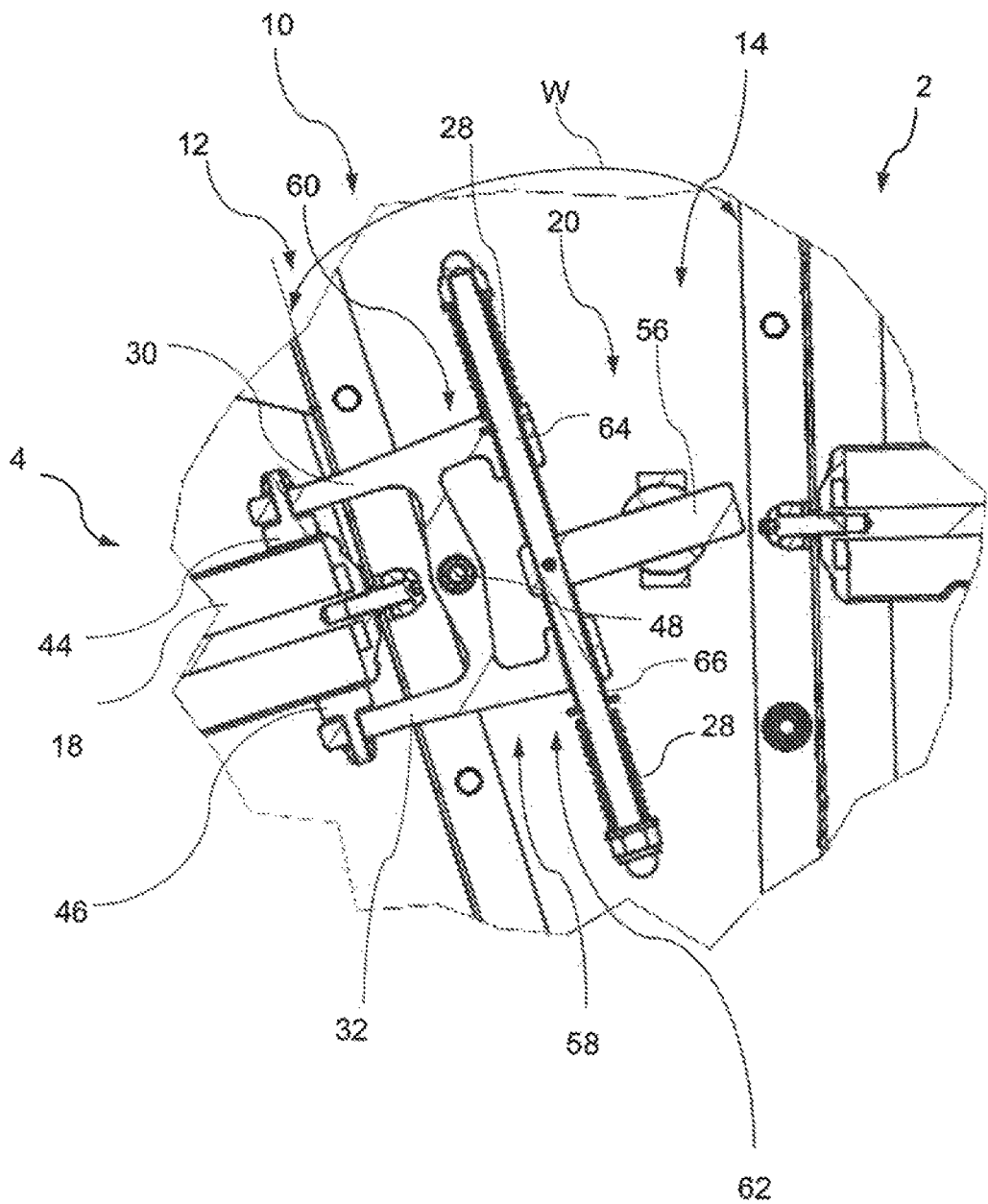
Figure 16:
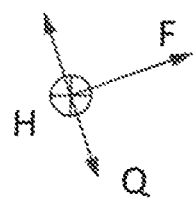

Exemplary embodiments of the conveying device according to the invention and of the drivetrain brake according to the invention will be discussed in more detail below on the basis of drawings, in which:

FIG. 1 shows a plan view of a conveying device according to a first exemplary embodiment of the invention with two conveying carriages during straight-ahead travel, FIG. 2 shows a plan view of the conveying device as per FIG. 1 with two conveying carriages during travel around a curve, FIG. 3 shows an enlarged view of the detail A as per FIG. 1 during straight-ahead travel of the two conveying carriages, FIG. 4 shows an enlarged view of the detail B as per FIG. 2 during travel of the two conveying carriages around a curve, FIG. 5 shows a plan view of a conveying device according to a second exemplary embodiment of the invention with two conveying carriages during straight-ahead travel, FIG. 6 shows a plan view of a conveying device as per FIG. 5 with two conveying carriages during travel around a curve, FIG. 7 shows an enlarged view of the detail B as per FIG. 5 during straight-ahead travel of the two conveying carriages, FIG. 8 shows an enlarged view of the detail A as per FIG. 6 during travel of the two conveying carriages around a curve, FIG. 9 shows a plan view of a conveying device according to a third exemplary embodiment of the invention with two conveying carriages during straight-ahead travel, FIG. 10 shows a plan view of a conveying device as per FIG. 9 with two conveying carriages during travel around a curve, FIG. 11 shows an enlarged view of the detail B as per FIG. 9 during straight-ahead travel of the two conveying carriages, FIG. 12 shows an enlarged view of the detail A as per FIG. 10 during travel of the two conveying carriages around a curve, FIG. 13 shows a plan view of a conveying device according to a fourth exemplary embodiment of the invention with two conveying carriages during straight-ahead travel, FIG. 14 shows a plan view of a conveying device as per FIG. 13 with two conveying carriages during travel around a curve, FIG. 15 shows an enlarged view of the detail B as per FIG. 13 during straight-ahead travel of the two conveying carriages, and FIG. 16 shows an enlarged view of the detail A as per FIG. 14 during travel of the two conveying carriages around a curve.

The conveying device 1 according to a first exemplary embodiment of the invention illustrated in a plan view in FIG. 1, with two conveying carriages 2, 4 during straight-ahead travel, has a first conveying carriage 2 and a second conveying carriage 4, which are arranged one behind the other in a conveying direction F, on transport rails 6.

In the first exemplary embodiment, both conveying carriages 2, 4 have a transverse-belt conveyor 8, and a drivetrain brake 10 is provided for the transverse-belt conveyor 8, wherein the drivetrain brake 10 has a brake apparatus 12 and an operating apparatus 14 (see FIG. 3) for the brake apparatus 12. The first conveying carriage 2, which is traveling ahead in the conveying direction F, has the operating apparatus 14, and the second conveying carriage 4, which is arranged so as to follow the first conveying carriage 2, has the brake apparatus 12.

In the case of more than two conveying carriages 2, 4 being used in the conveying device 1, it is possible, by contrast to the illustration in FIG. 1, for the first conveying carriage 2 to additionally have a brake apparatus, which is coupled and/or couplable to an operating apparatus of a conveying carriage traveling ahead, and for the second conveying carriage 4 to additionally have an operating apparatus which is coupled and/or couplable to a brake apparatus of a conveying carriage following in the conveying direction.

The two conveying carriages 2, 4 are illustrated during straight-ahead travel and are oriented together in the conveying direction, that is to say have neither a transverse offset nor an angular offset W (illustrated in FIG. 2 and FIG. 4) with respect to one another. The brake apparatus 12 has thus been pivoted and/or redirected, by means of the operating apparatus 14, into a release state illustrated on an enlarged scale in FIG. 3, in which no (or only a reduced) braking force is exerted on an element of a drivetrain of the transverse-belt conveyor 8.

In the first exemplary embodiment, that element of the drivetrain on which the braking force is exerted is a counterpressure roller 18 (see FIG. 3) with respect to a friction roller (not illustrated) for driving the transverse belt 16. In general, the element of the drivetrain may be referred to as "braked element of the drivetrain".

In the plan view, illustrated in FIG. 2, of the conveying device 1 as per FIG. 1 with two conveying carriages 2, 4 during travel around a curve, the two conveying carriages 2, 4 have an angular offset W with respect to one another. Thus, the brake apparatus 12 has, by means of the operating apparatus 14, been pivoted into a braking state illustrated on an enlarged scale in FIG. 4, in which a braking force is exerted on the counterpressure roller 18.

The angular offset W between the transverse conveying directions Q of the two conveying carriages 2, 4 is approximately equal to the angular offset W between the conveying directions F of the two conveying carriages 2, 4. In the drawings, in each case only an angular offset W is indicated.

In the enlarged view, shown in FIG. 3, of the detail A as per FIG. 1, the drivetrain brake 10 and thus the operating apparatus 14 and the brake apparatus 12 are illustrated, during straight-ahead travel of the two conveying carriages 2, 4, in the release state, which will be described below:

In the first exemplary embodiment, the operating apparatus 14 has two operating elements 20, which in the first exemplary embodiment are formed as a first tension rod 22 and a second tension rod 24. The tension rods 22, 24 are oriented in each case approximately parallel to the conveying direction F and thus also parallel to one another. The tension rods 22, 24 are attached and/or mounted with in each case three rotational degrees of freedom, and exactly one translational degree of freedom parallel to the conveying direction F, to the first conveying carriage 2. As illustrated here, the tension rods 22, 24 may be attached to the first conveying carriage 2 for example by means of a flange bearing 26 with spherical cap, wherein a free end of the respective tension rod 22, 24, which projects into a region of the first conveying carriage 2, is received in longitudinally displaceable fashion in the spherical cap.

Each of the tension rods 22, 24 is, by means of an elastic element 28, preloaded with its free end, which projects into the region of the first conveying carriage, against a shoulder on the respective tension rod 22, 24. During straight-ahead travel as shown in FIG. 3, the elastic element 28 may be preloaded between the free end and a disk. The disk has an inner diameter which is configured to be smaller than an outer diameter of a shoulder (or some other obstruction) formed on the tension rod 22 and 24, such that the disk cannot be moved beyond said shoulder in the direction of the flange bearing 26. During straight-ahead travel as shown in FIG. 3, the elastic element 28 is thus preloaded within the tension rod 22 and 24, but not against the conveying carriage 2 and/or the flange bearing 26. Between the disk and the flange bearing 26, an axially displaceable cylinder may also be arranged over the respective tension rod 22 and 24, which cylinder supports the spring against the flange bearing 26. Here, during straight-ahead travel, there is a degree of play between the cylinder and the flange bearing 26.

The preload within the two tension rods 22 and 24 makes it possible, owing to the preload, on the one hand, and the play, on the other hand, for the braking action to take effect practically immediately upon the onset of an angular and/or transverse offset.

Here, the preload within the first tension rod 22 is preferably equal to the preload within the second tension rod 24. In the first exemplary embodiment, the elastic element 28 is formed as a pressure spring.

In the first exemplary embodiment, the brake apparatus 12 has a first brake lever 30 and a second brake lever 32 formed as a single piece with said first brake lever.

Preferably, an approximately T-shaped lever is thus formed, which, on a transverse web 34 of the T shape, has first and second end sections 36, 38 which are situated opposite one another in the transverse conveying direction Q. A longitudinal web 40 of the T shape is formed by in each case one first and second longitudinal section of the brake levers 30, 32. Here, the two longitudinal sections are oriented approximately parallel to one another and are spaced apart from one another in the transverse conveying direction Q.

The tension rods 22, 24 are coupled in each case at the end sections 36, 38 of the T-shaped lever to the brake levers 30, 32, wherein the tension rods 22, 24, at this coupling end, have three rotational degrees of freedom and no translational degree of freedom. As illustrated here, the tension rods 22, 24 may, at the end thereof situated opposite the free end, be coupled for example by means of ball joint heads 42 to the brake levers 30, 32.

The brake levers 30, 32 are attached with exactly one rotational degree of freedom about a vertical axis H, and without a translational degree of freedom, to the second conveying carriage 4. The vertical axis H is oriented perpendicular to the conveying direction F and perpendicular to the transverse conveying direction Q and runs through a center of rotation 48.

On the brake levers 30, 32, in particular on longitudinal sections of the brake levers 30, 32, there are formed first and second friction elements 44, 46 which are each formed as rubber friction linings. The friction elements 44, 46 may be arranged such that they can act on the counterpressure roller 18 from sides which are mutually opposite in the transverse conveying direction Q. In the illustrated release state, the friction elements 44, 46 are not in contact with the counterpressure roller 18, that is to say no braking force is exerted on the counterpressure roller 18.

In the enlarged view, shown in FIG. 4, of the detail B as per FIG. 2, the drivetrain brake 10 and thus the operating apparatus 14 and the brake apparatus 12 are illustrated, during travel of the two conveying carriages 2, 4 around a curve, in the respective braking state, which will be described below:

In the illustrated braking state, the first conveying carriage 2, which is traveling ahead and which has the operating apparatus 14, has an angular offset W with respect to the following second conveying carriage 4, which has the brake apparatus 12. The angular offset W results from the illustrated travel of the two conveying carriages 2, 4 around a curve, wherein only one of the two conveying carriages 2, 4 has to be traveling around a curve in order to generate the angular offset W.

Considering travel of the conveying carriages 2, 4 around a right-hand curve, the first brake lever 30 with the first friction element 44 and the first tension rod 22 are arranged on a side at the outside of the curve, and the second brake lever 32 with the second friction element 46 and the second tension rod 24 are arranged on a side at the inside of the curve, of the conveying carriages 2, 4.

The first conveying carriage 4 is thus further remote from the second conveying carriage 4 in the region of the first tension rod 22 than in the region of the second tension rod 24.

Owing to the abovementioned rotational and translational degrees of freedom with which the tension rods 22, 24 are in each case arranged on the first conveying carriage 2, it is the case during travel around a curve that the tension rods 22, 24 are in an orientation which deviates from the conveying direction F, wherein the tension rod at the outside of the curve, in this case the first tension rod 22, is pulled further out of the region of the first conveying carriage 2 than the tension rod at the inside of the curve, in this case the second tension rod 24, which is pushed further into the region of the first conveying carriage 2.

The elastic element 28 of the first tension rod 22 is thus compressed by the first conveying carriage 2, whereby tension is exerted on the first brake lever 30. FIG. 4 illustrates the elastic element 28, which is formed as a pressure spring, at the first tension rod 22 in a non-compressed state owing to a drawing error, even though said elastic element is in fact indeed compressed between the disk, which abuts against the shoulder of the tension rod 22, and the free end of the tension rod 22. Here, the disk has been displaced by the cylinder in the direction of the free end, which in turn is supported on the flange bearing 26.

Here, the cylinder at the tension rod at the inside of the curve (in this case the tension rod 24) is unloaded, and is displaceable over a degree of play which is increased in the curve.

In the first exemplary embodiment, the drivetrain brake 10 is configured such that, as seen in the illustrated plan view of an installed state of the brake levers 30, 32, if the first conveying carriage 2 travels around a clockwise curve, the brake levers 30, 32 are pivoted clockwise about the fixed center of rotation 48, wherein the second friction element 46 at the inside of the curve is pressed against the braked element of the drivetrain, in this case the counterpressure roller 18. If the first conveying carriage 2 travels around an anticlockwise curve, the brake levers 30, 32 are pivoted counterclockwise, wherein the first friction element 44 at the outside of the curve is pressed against the braked element of the drivetrain, that is to say the counterpressure roller 18.

The conveying device 1, illustrated in FIG. 5 to FIG. 8, according to a second exemplary embodiment of the invention with two conveying carriages 2, 4 deviates from the above-described conveying device 1 according to the first exemplary embodiment in the configuration of the drivetrain brake 10. Below, the deviations therefrom will be described, wherein identical or similar components will be denoted by the same reference designations.

The two conveying carriages 2, 4 shown in plan view in FIG. 5 are illustrated during straight-ahead travel and are oriented together in the conveying direction F, that is to say have neither a transverse offset nor an angular offset W (illustrated in FIG. 6 and FIG. 8) with respect to one another. The brake apparatus 12 has thus been pivoted by means of the operating apparatus 14 into a release state illustrated on an enlarged scale in FIG. 7, in which no braking force is exerted on the element of the drivetrain of the transverse-belt conveyor, in particular on the counterpressure roller 18.

In the plan view, illustrated in FIG. 6, of the conveying device 1 as per FIG. 5 with two conveying carriages 2, 4 during travel around a curve, the conveying carriages 2, 4 have an angular offset W with respect to one another. Thus, the brake apparatus 12 has been pivoted by means of the operating apparatus 14 into a braking state, illustrated on an enlarged scale in FIG. 8, in which a braking force is exerted on the counterpressure roller 18.

In the enlarged view, shown in FIG. 7, of the detail B as per FIG. 5, the drivetrain brake 10 and thus the operating apparatus 14 and the brake apparatus 12 are illustrated, during straight-ahead travel of the two conveying carriages 2, 4, in the respective release state, which will be described below:

In the second exemplary embodiment, the operating apparatus 14 has an operating element 20 which, in the second exemplary embodiment, is formed as a U-shaped bracket 50. The bracket 50 has, spaced apart from one another in the transverse conveying direction Q, a first flange section 52 and a second flange section 54, which are oriented approximately in the conveying direction F of the first conveying carriage 2. In the installed position of the bracket 50, the flange sections 52, 54 point toward the second conveying carriage 4. The bracket 50 is attached without any degree of freedom to the first conveying carriage 2.

In the second exemplary embodiment, the brake apparatus 12 has a first brake lever 30 and a second brake lever 32, which are attached, spaced apart from one another in the transverse conveying direction Q, to the second conveying carriage 4. The brake levers 30, 32 have in each case exactly one rotational degree of freedom about the vertical axis H and no translational degree of freedom.

The brake levers 30, 32 are, at their end sections facing toward the operating apparatus 14, preloaded against one another by means of an elastic element 28, which in the second exemplary embodiment is formed as a pressure spring.

Counter to the preload, the brake levers 30, 32 are, during straight-ahead travel of the two conveying carriages 2, 4, held in a release state by the operating apparatus 14, in particular by the U-shaped bracket 50 and its flange sections 52, 54, in which release state the friction elements 44, 46 are not in contact with the counterpressure roller 18. Thus, in the release state, no braking force is exerted on the counterpressure roller 18.

In the enlarged view, shown in FIG. 8, of the detail A as per FIG. 6, the drivetrain brake 10 and thus the operating apparatus 14 and the brake apparatus 12 are illustrated, during travel of the two conveying carriages 2, 4 around a curve, in the respective braking state, which will be described below:

In the illustrated braking state, the first conveying carriage 2, which is traveling ahead and which has the operating apparatus 14, has an angular offset W with respect to the following second conveying carriage 4, which has the brake apparatus 12. The angular offset W results from the illustrated travel of the two conveying carriages 2, 4 around a curve, wherein only one of the two conveying carriages 2, 4 has to be traveling around a curve in order to generate the angular offset W.

Considering travel of the conveying carriages 2, 4 around a right-hand curve, the first brake lever 30 with the first friction element 44 and the first flange section 52 are arranged on a side at the outside of the curve, and the second brake lever 32 with the second friction element 46 and the second flange section 54 are arranged on a side at the inside of the curve, of the conveying carriages 2, 4.

The first conveying carriage 2, 4 is thus further remote from the second conveying carriage 4 in the region of the first flange section 52 than in the region of the second flange section 54.

Since the bracket 50 moves with the first conveying carriage 2 during travel around a curve, it is the case that, as the first conveying carriage 2 enters a curve, firstly the first flange section 52 is pivoted out of the region of the first brake lever 30, wherein the second flange section 54 remains in the region of the second brake lever 32. The second brake lever 32 is supported by the second flange section 54, and the first brake lever 30 is pivoted about its center of rotation 48 by the preloaded pressure spring 28, and brakes the counterpressure roller.

According to the second exemplary embodiment, the drivetrain brake 10 is configured such that, as seen in the illustrated plan view of an installed position of the brake levers 30, 32, if the first conveying carriage 2 travels around a clockwise curve, the first brake lever 30 is pivoted counterclockwise, wherein the first friction element 44, which is at the outside of the curve, is pressed against the element of the drivetrain, that is to say the counterpressure roller 18.

After entry into the curve is complete, that is to say when the second conveying carriage 4 has also already entered the curve, the brake lever 32 can also be released from the position held by the second flange section 54, and brake the counterpressure roller 18 via the second friction element 46. This may occur such that the bracket 50 together with the two flange sections 52 and 54 are arranged in a different horizontal plane than the two brake levers 30, 32. Thus, the two brake levers 30, 32 are, during straight-ahead travel, pressed together only by the vertical projections (for example cylinders and/or screws) illustrated at the respective ends, averted from the bracket, of the flange sections 52 and 54, but not by the flange sections 52 and 54 themselves. After entry into the curve is complete, it is thus also possible for the lever 32 to be deflected beyond the flange sections 54 and actuate the friction element 46.

In general, if the first conveying carriage 2 enters the curve first, it is firstly the brake lever at the outside of the curve that is pivoted, wherein the friction element at the outside of the curve is pressed against the braked element of the drivetrain, in this case the counterpressure roller 18. Subsequently, that is to say when both conveying carriages 2 and 4 have fully entered the curve, the brake lever at the inside of the curve is also pivoted, wherein the friction element at the inside of the curve is additionally pressed against the braked element of the drivetrain, in this case the counterpressure roller 18.

During an exit from a curve, it is firstly the case that the brake lever at the inside of the curve is pivoted and the braking action thereof is reduced or eliminated, whereupon, during fully straight-ahead travel, the brake lever at the outside of the curve is pivoted and released by the counterpressure roller 18.

The conveying device illustrated in FIG. 9 to FIG. 12, according to a third exemplary embodiment of the invention with two conveying carriages 2, 4 deviates from the above-described conveying device 1 according to the first or second exemplary embodiment in the configuration of the drivetrain brake 10. Below, the deviations therefrom will be described, wherein identical or similar components will be denoted by the same reference designations.

The two conveying carriages 2, 4 shown in plan view in FIG. 9 are illustrated during straight-ahead travel and are oriented together in the conveying direction F, that is to say have neither a transverse offset nor an angular offset W (illustrated in FIG. 10 and FIG. 12) with respect to one another. The brake apparatus 12 has thus been pivoted by means of the operating apparatus 14 into a release state illustrated on an enlarged scale in FIG. 11, in which no braking force is exerted on the element of the drivetrain of the transverse-belt conveyor, in particular on the counterpressure roller 18.

In the plan view, illustrated in FIG. 10, of the conveying device as per FIG. 9 with two conveying carriages 2, 4 during travel around a curve, the conveying carriages 2, 4 have an angular offset W with respect to one another. Thus, the brake apparatus 12 has been pivoted by means of the operating apparatus into a braking state, illustrated on an enlarged scale in FIG. 12, in which a braking force is exerted on the counterpressure roller 18.

In the enlarged view, shown in FIG. 11, of the detail B as per FIG. 9, the drivetrain brake 10 and thus the operating apparatus 14 and the brake apparatus 12 are illustrated, during straight-ahead travel of the two conveying carriages 2, 4, in the respective release state, which will be described below:

In the third exemplary embodiment, the operating apparatus 14 has an operating element 20 which, in the third exemplary embodiment, is formed as an actuator 56 with an actuating surface which is cylindrical at least in certain portions. As an alternative to this, the actuator 56 may be formed with an actuating surface which is spherical or ellipsoidal at least in certain sections. The actuator 56 is attached without any degree of freedom to the first conveying carriage 2, wherein a fastening device of the actuator 56 to the first conveying carriage 2 is not illustrated in FIG. 11.

The brake apparatus 12 has, in the third exemplary embodiment, a first brake lever 30 and a second brake lever 32 formed as a single piece with said first brake lever 30.

An H-shaped lever 58 is thus preferably formed, which has first and second end sections 60, 62 which are spaced apart from one another in the transverse conveying direction Q and which face toward the operating apparatus 14. The brake levers 30, 32 are attached with exactly one rotational degree of freedom about the vertical axis H, and without any translational degree of freedom, to the second conveying carriage 4.

At the end sections 60, 62, there is arranged in each case one first and second plunger 64, 66 with exactly one translational degree of freedom in the transverse conveying direction Q and with exactly one rotational degree of freedom about the transverse conveying direction Q. As an alternative to this, the plungers 64, 66 may be formed with exactly one translational degree of freedom in the transverse conveying direction Q and without any rotational degree of freedom. The translational degree of freedom can be utilized in order, by way of the elastic spring, to utilize the transverse offset Q for braking purposes in the curve. Without this degree of freedom, constraining forces can arise in the curve. This would have the result that a preload of the elastic elements could be realized only with difficulty.

In the third exemplary embodiment, the plungers 64, 66 are arranged in alignment with one another. Furthermore, in the third exemplary embodiment, the plungers 64, 66 are in each case preloaded against the respective end sections 60, 62 of the lever 58 in the direction of the operating element 20, in particular the actuator 56, by means of a pressure spring 28, and can receive the actuator 56 between them. Here, the pressure springs 28 are preloaded within the respective plunger 64 and 66, that is to say between an end facing toward the actuator 56 and the end section 60, 62 of the lever 58, without exerting pressure on the actuator 56.

Depending on the degree of freedom, the plungers 64, 66 are formed in each case as an, in particular adjustable, pickup for the movement of the actuator 56 in the transverse conveying direction Q.

On the brake levers 30, 32, in particular on longitudinal sections formed opposite the respective end sections 60, 62 in the conveying direction F, of the brake levers, there are formed friction elements 44, 46 formed in each case as a rubber friction lining. The friction elements 44, 46 may, as shown, be arranged such that those sides which are situated opposite one another in the transverse conveying direction Q can act on the counterpressure roller 18. In the illustrated release state, the friction elements 44, 46 are not in contact with the counterpressure roller 18, that is to say no braking force is exerted on the counterpressure roller 18.

In the enlarged view, shown in FIG. 12, of the detail A as per FIG. 10, the drivetrain brake 10 and thus the operating apparatus 14 and the brake apparatus 12 are illustrated, during travel of the two conveying carriages 2, 4 around a curve, in the respective braking state, which will be described below:

In the illustrated braking state, the first conveying carriage 2, which is traveling ahead and which has the operating apparatus, has an angular offset W with respect to the following second conveying carriage 4, which has the brake apparatus 12. The angular offset W results from the illustrated travel of the two conveying carriages 2, 4 around a curve, wherein only one of the two conveying carriages 2, 4 has to be traveling around a curve in order to generate the angular offset W.

Furthermore, the first conveying carriage 2, which is traveling ahead and which has the operating apparatus, has, in relation to the following second conveying carriage 4, which has the brake apparatus 12, a transverse offset with respect to the orientation of the second conveying carriage 4. This transverse offset results from the illustrated travel of the two conveying carriages 2, 4 around a curve, and activates the drivetrain brake 10.

Considering travel of the conveying carriages 2, 4 around a right-hand curve, the first brake lever 30 with the first friction element 44 and the first plunger 64 are arranged on a side at the outside of the curve, and the second brake lever 32 with the second friction element 46 and the second plunger 66 are arranged on a side at the inside of the curve, of the conveying carriages 2, 4.

The first conveying carriage 2, 4 is thus further remote from the second conveying carriage 4 in the region of the first plunger 64 than in the region of the second plunger 66.

During entry into the curve, the actuator 56 is initially moved out of the curve, whereby the (in this case first) plunger 64 at the outside of the curve is briefly moved counter to the pressure spring 28. Here, a spacing between the actuator 56 and the first plunger 64 decreases, and the first plunger 64 is displaced along the transverse conveying direction Q counter to the pressure spring 28.

After entry into the curve is complete, the actuator 56 has a transverse offset with respect to the inside of the curve, whereby the (in this case second) plunger 66 at the inside of the curve is moved counter to its pressure spring 28. Thus, when a predetermined transverse offset is attained, the first brake lever 30 is pivoted together with the second brake lever 32 about their common center of rotation 48. During the pivoting of the brake levers 30, 32, a spacing between the actuator 56 and the first plunger 64 increases, and the spring force on the first plunger 64 decreases. Here, a spacing between the actuator 56 and the second plunger 66 decreases, and the second plunger 66 is displaced counter to its pressure spring 28 along the transverse conveying direction Q. After a predetermined transverse offset has been attained, the second brake lever 32 is, for the remainder of the entire period of travel around the curve, pivoted together with the first brake lever 30 about the common center of rotation 48 thereof.

During an exit from a curve, intense compression of the pressure spring 28 at the plunger at the inside of the curve (in this case the second plunger 66) is briefly maintained, before the situation shown in FIG. 11 takes effect again.

The drivetrain brake 10 is, according to the third exemplary embodiment, configured such that, as seen in the illustrated plan view of an installed position of the brake levers 30, 32, if the first conveying carriage 2 travels around a clockwise curve, the brake levers 30, 32 are firstly (upon entry into the curve) pivoted briefly counterclockwise and subsequently (when entry into the curve is complete) clockwise, wherein firstly the first friction element 44 at the outside of the curve is pressed against the element of the drivetrain, in particular the counterpressure roller 18, and subsequently the second friction element 46 at the inside of the curve is pressed against the element of the drivetrain, in particular the counterpressure roller 18.

The conveying device, illustrated in FIG. 13 to FIG. 16, according to a fourth exemplary embodiment of the invention with two conveying carriages 2, 4 deviates from the conveying device 1 according to the above-described exemplary embodiments in the configuration of the drivetrain brake 10. Below, the deviations therefrom will be described, wherein identical or similar components will be denoted by the same reference designations.

The two conveying carriages 2, 4 shown in plan view in FIG. 13 are illustrated during straight-ahead travel and are oriented together in the conveying direction F, that is to say have neither a transverse offset nor an angular offset W (illustrated in FIG. 14 and FIG. 16) with respect to one another. The brake apparatus 12 has thus been pivoted by means of the operating apparatus 14 into a release state illustrated on an enlarged scale in FIG. 15, in which no braking force is exerted on the element of the drivetrain of the transverse-belt conveyor, in particular on the counterpressure roller 18.

In the plan view, illustrated in FIG. 14, of the conveying device 1 as per FIG. 13 with two conveying carriages 2, 4 during travel around a curve, the conveying carriages 2, 4 have an angular offset W with respect to one another. There is furthermore a transverse offset between the two conveying carriages 2 and 4, which ultimately actuates the drivetrain brake 10. Thus, the brake apparatus 12 has been pivoted by means of the operating apparatus 14 into a braking state, illustrated on an enlarged scale in FIG. 16, in which a braking force is exerted on the counterpressure roller 18.

In the enlarged view, shown in FIG. 15, of the detail B as per FIG. 13, the drivetrain brake 10 and thus the operating apparatus 14 and the brake apparatus 12 are illustrated, during straight-ahead travel of the two conveying carriages 2, 4, in the respective release state, which will be described below:

In the fourth exemplary embodiment, the operating apparatus 14 has an operating element 20 which, in the fourth exemplary embodiment, is formed as an actuator 56 with a free end section. The actuator 56 is, at its free end section, attached with three rotational degrees of freedom, and exactly one translational degree of freedom in the conveying direction F, to the first conveying carriage 2, wherein a fastening device of the actuator 56 to the first conveying carriage 2 is not illustrated in FIG. 15.

The brake apparatus 12 has, in the third exemplary embodiment, a first brake lever 30 and a second brake lever 32 formed as a single piece with said first brake lever 30.

An H-shaped lever 58 is thus preferably formed, which has first and second end sections 60, 62 which are spaced apart from one another in the transverse conveying direction Q and which face toward the operating apparatus 14. The brake levers 30, 32 are attached with exactly one rotational degree of freedom about the vertical axis, and without any translational degree of freedom, to the second conveying carriage 4.

At the end sections 60, 62, there is arranged in each case one first plunger 64 and one second plunger 66 formed as a single piece with said first plunger, said plungers having exactly one translational degree of freedom in the transverse conveying direction Q and having exactly one rotational degree of freedom about the transverse conveying direction Q.

In the fourth exemplary embodiment, the plungers 64, 66 are arranged in alignment with one another and protrude with their free ends beyond the end sections 60, 62 of the lever 58. Furthermore, in the fourth exemplary embodiment, the plungers 64, 66 are, at their free ends, preloaded by means of in each case one pressure spring 28 against in each case one disk on a shoulder of the plungers 64, 66, similarly to the situation in the first exemplary embodiment. The preload is thus built up in each case within the plungers 64, 66, without load being exerted on the actuator 56. The respective end sections 60, 62 of the lever 58 are fixedly coupled, approximately in the middle of the plungers 64, 66 in the transverse conveying direction Q, to the actuator 56. It is thus possible only as a result of a transverse offset for the actuator 56 to press against the spring, whereby the preloaded force can then immediately act on the drivetrain brake 10.

On the brake levers 30, 32, in particular on longitudinal sections formed opposite the respective end sections 60, 62 in the conveying direction F, of the brake levers 30, 32, first and second friction elements 44, 46 which are formed in each case as a rubber friction lining are arranged such that they can act from sides which are situated opposite one another in the transverse conveying direction Q on the counterpressure roller 18. In the illustrated release state, the friction elements 44, 46 are not in contact with the counterpressure roller 18, that is to say no braking force is exerted on the counterpressure roller 18.

In the enlarged view, shown in FIG. 16, of the detail A as per FIG. 14, the drivetrain brake 10 and thus the operating apparatus 14 and the brake apparatus 12 are illustrated, during travel of the two conveying carriages 2, 4 around a curve, in the respective braking state, which will be described below:

In the illustrated braking state, the first conveying carriage 2, which is traveling ahead and which has the operating apparatus 14, has an angular offset W with respect to the following second conveying carriage 4, which has the brake apparatus 12. The angular offset W results from the illustrated travel of the two conveying carriages 2, 4 around a curve, wherein only one of the two conveying carriages 2, 4 has to be traveling around a curve in order to generate the angular offset W. What is crucial for the braking action is however the transverse offset of the two conveying carriages 2 and 4, which arises during travel around a curve.

Considering travel of the conveying carriages 2, 4 around a right-hand curve, the first brake lever 30 with the first friction element 44 and the first plunger 64 are arranged on a side at the outside of the curve, and the second brake lever 32 with the second friction element 46 and the second plunger 66 are arranged on a side at the inside of the curve, of the conveying carriages 2, 4.

The first conveying carriage 2 is thus further remote from the second conveying carriage 4 in the region of the first plunger 64 than in the region of the second plunger 66.

Since the actuator 56 moves with the first conveying carriage 2 during travel around a curve, the plungers 64, are initially, upon entry into a curve, displaced along the transverse conveying direction Q toward the outside of the curve counter to the pressure spring 28 at that free end of the respective plunger 64, 66 which is at the inside of the curve, which can give rise to a braking action of the friction element 44 or 46 at the outside of the curve.

When entry into the curve is complete, that is to say when for example both conveying carriages 2 and 4 have entered the curve and/or a predetermined transverse offset has been attained, the first brake lever 30 is pivoted together with the second brake lever 32 about their common center of rotation 48. During the pivoting of the brake levers 30, 32, the spring force of the pressure spring 28 at that free end of the respective plunger 64, 66 which is at the inside of the curve decreases. Here, the plungers 64, 66 are displaced along the transverse conveying direction Q counter to the pressure spring 28 at that free end of the respective plunger 64, 66 which is at the outside of the curve. After a predetermined transverse offset has been attained, the second brake lever 32 is, for the remainder of the period of travel around the curve, pivoted together with the first brake lever 30 about the common center of rotation 48 thereof. Here, a braking action is realized by means of the friction element at the inside of the curve (in FIG. 16, the friction element 46), with compression of the pressure spring 28 at the outside of the curve.

During an exit from a curve, an even more intense compression of the pressure spring 28 at the outside of the curve initially occurs, before the situation shown in FIG. 15 takes effect again.

The drivetrain brake 10 is, according to the fourth exemplary embodiment, configured such that, as seen in the illustrated plan view of an installed position of the brake levers 30, 32, if the first conveying carriage 2 travels around a clockwise curve, the brake levers 30, are firstly (upon entry into the curve) pivoted counterclockwise and subsequently (when entry into the curve is complete) clockwise, wherein firstly (upon entry into the curve) the first friction element 44 at the outside of the curve is pressed against the element of the drivetrain, in particular the counterpressure roller 18, and subsequently (when entry into the curve is complete) the second friction element 46 at the inside of the curve is pressed against the element of the drivetrain, in particular the counterpressure roller 18.

LIST OF REFERENCE DESIGNATIONS

1 Conveying device
2 First conveying carriage
4 Second conveying carriage
6 Transport rail
8 Transverse-belt conveyor
10 Drivetrain brake
12 Brake apparatus
14 Operating apparatus
16 Transverse belt
18 Counterpressure roller
20 Operating element
22 First tension rod
24 Second tension rod
26 Flange bearing with spherical cap
28 Elastic element, in particular pressure spring
30 First brake lever
32 Second brake lever
34 Transverse web of the T-shaped lever
36 First end section of the T-shaped lever
38 Second end section of the T-shaped lever
40 Longitudinal web of the T-shaped lever
42 Ball joint head
44 First friction element
46 Second friction element
48 Center of rotation
50 Bracket
52 First flange section
54 Second flange section
56 Actuator
58 H-shaped lever
60 First end section of the H-shaped lever
62 Second end section of the H-shaped lever
64 First plunger
66 Second plunger
F Conveying direction
H Vertical axis
Q Transverse conveying direction
W Angular offset

The invention claimed is:

1. A conveying device having:
at least one first and one second conveying carriage which are arranged one behind the other in a conveying direction,
a transverse-belt conveyor which is formed on at least the second conveying carriage and which serves for conveying material for conveying in a transverse conveying direction oriented substantially transversely with respect to the conveying direction, and
a drivetrain brake for the transverse-belt conveyor,
wherein the drivetrain brake has a brake apparatus and an operating apparatus for the brake apparatus, wherein the operating apparatus is arranged on the first conveying carriage and the brake apparatus is arranged on the second conveying carriage,
wherein the brake apparatus can be placed into a braking state in which the brake apparatus exerts a braking force on an element of a drivetrain of the transverse-belt conveyor, and can be placed into a release state, in which the brake apparatus exerts no or a reduced braking force on an element of a drivetrain of the transverse-belt conveyor,
wherein the operating apparatus and the brake apparatus interact such that, during substantially straight-ahead travel of the first and second conveying carriage, the brake apparatus assumes the release state and, during travel of at least one of the conveying carriages around a curve, the brake apparatus assumes the braking state, in order to allow a movement of a transverse belt (16) of the transverse-belt conveyor in the transverse conveying direction during straight-ahead travel and to brake such a movement during travel around a curve.

2. The conveying device as claimed in claim 1, wherein the first conveying carriage with the operating apparatus arranged thereon is arranged so as to travel ahead, in the conveying direction, of the second conveying carriage with the brake apparatus.

3. The conveying device as claimed in claim 1, wherein the brake apparatus has a first brake lever with a first friction element arranged thereon, wherein the first brake lever is mounted pivotably on the second conveying carriage and wherein, in the braking state of the brake apparatus, the first brake lever is pivoted such that the first friction element is pressed against the element of the drivetrain.

4. The conveying device as claimed in claim 3, wherein the drivetrain brake has at least one elastic element, by means of the spring force of which the first brake lever is pivoted in the braking state.

5. The conveying device as claimed in claim 4, wherein the elastic element is preloaded within a component of the brake apparatus.

6. The conveying device as claimed in claim 3, wherein the element of the drivetrain is a counterpressure roller for a friction roller for driving the transverse belt.

7. The conveying device as claimed in claim 3, wherein the first brake lever is attached with exactly one rotational degree of freedom, about a vertical axis (H) which is oriented perpendicular to the conveying direction and perpendicular to the transverse conveying direction, and without a translational degree of freedom, to the second conveying carriage.

8. The conveying device as claimed in claim 3, wherein the first brake lever is pivotable by means of the operating apparatus into the braking state and/or into the release state.

9. The conveying device as claimed in claim 3, wherein the drivetrain brake is configured such that the brake apparatus is placed into the braking state by means of the operating apparatus in the presence of a transverse offset and/or angular offset of the conveying carriages with respect to one another.

10. The conveying device as claimed in claim 3, wherein the drivetrain brake is configured such that the operating apparatus places the brake apparatus into the release state in the absence of a transverse offset and angular offset of the conveying carriages with respect to one another.

11. The conveying device as claimed in claim 3, wherein the brake apparatus has, in addition to the first brake lever, a second brake lever with a second friction element arranged thereon, wherein, preferably, the first brake lever is formed as a single piece with the second brake lever, and wherein the brake levers are arranged on mutually opposite sides of the element of the drivetrain.

12. The conveying device as claimed in claim 1, wherein the operating apparatus has one or more operating elements which is or are attached with in each case at least two rotational degrees of freedom, about the vertical axis and about the transverse conveying direction, and with exactly one translational degree of freedom, which in the release state is oriented approximately parallel to the conveying direction, to the first conveying carriage.

13. The conveying device as claimed in claim 1, wherein the operating apparatus has an operating element which is attached without a degree of freedom to the first conveying carriage.

* * * * *